(12) United States Patent
Hao

(10) Patent No.: US 10,459,591 B2
(45) Date of Patent: Oct. 29, 2019

(54) TOUCH PANELS

(71) Applicant: Shenzhen China Star Optoelectronics Technology Co., Ltd., Shenzhen, Guangdong (CN)

(72) Inventor: Sikun Hao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 88 days.

(21) Appl. No.: 15/021,706

(22) PCT Filed: Feb. 25, 2016

(86) PCT No.: PCT/CN2016/074549
§ 371 (c)(1),
(2) Date: Nov. 27, 2017

(87) PCT Pub. No.: WO2017/128466
PCT Pub. Date: Aug. 3, 2017

(65) Prior Publication Data
US 2018/0113539 A1    Apr. 26, 2018

(30) Foreign Application Priority Data

Jan. 29, 2016   (CN) .......................... 2016 1 0067567

(51) Int. Cl.
*G06F 3/047*       (2006.01)
*G02F 1/1333*      (2006.01)
(Continued)

(52) U.S. Cl.
CPC .......... *G06F 3/047* (2013.01); *G02F 1/13338* (2013.01); *G02F 1/134309* (2013.01);
(Continued)

(58) Field of Classification Search
None
See application file for complete search history.

(56) References Cited

U.S. PATENT DOCUMENTS

| 8,791,916 B2 | 7/2014 | Mizuhashi et al. |
| 9,001,080 B2 * | 4/2015 | Okayama .............. G06F 3/0416 345/174 |

(Continued)

OTHER PUBLICATIONS

Volker Strumpen, Introduction to Digital Circuits, Basic Digital Circuits, v1.2.2, 2015, pp. 1-44 downloaded from http://bibl.ica.jku.at/dc/build/html/basiccircuits/basiccircuits.html (Year: 2015).*

*Primary Examiner* — Dorothy Harris
(74) *Attorney, Agent, or Firm* — Andrew C. Cheng

(57) ABSTRACT

A touch panel includes a first strobe circuit, at least two touch electrodes arranged along a row direction, and at least two wirings connecting with each of the touch electrodes. The first strobe circuit includes at least two first ends and at least two second ends, one of the first end is configured for providing touch driving signals, each of the second ends directly or indirectly connects with one wiring, a number of the first ends is smaller than the number of the second ends, and the first end for providing the touch driving signals selectively connects to one of the second ends. In this way, the number of the driving wirings may be reduced, and so does the dimension occupied by the driving wirings, which is beneficial to the narrow border design.

18 Claims, 8 Drawing Sheets

(51) Int. Cl.
*G02F 1/1343* (2006.01)
*G09G 3/36* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04103* (2013.01); *G09G 3/3674* (2013.01)

(56) References Cited

U.S. PATENT DOCUMENTS

| | | | | |
|---|---|---|---|---|
| 9,727,169 B2* | 8/2017 | Fu | ............................ | G06F 3/041 |
| 2003/0080783 A1* | 5/2003 | Kozaki | ...................... | G06F 7/68 |
| | | | | 327/22 |
| 2010/0117986 A1* | 5/2010 | Yang | .................. | H03K 17/9622 |
| | | | | 345/174 |
| 2010/0194698 A1* | 8/2010 | Hotelling | ............... | G06F 1/3218 |
| | | | | 345/173 |
| 2012/0044196 A1* | 2/2012 | Mizuhashi | ................. | G06F 1/32 |
| | | | | 345/174 |
| 2013/0293498 A1 | 11/2013 | Kim et al. | | |
| 2013/0314343 A1 | 11/2013 | Cho et al. | | |
| 2013/0342498 A1* | 12/2013 | Kim | ........................ | G06F 3/044 |
| | | | | 345/174 |
| 2014/0292709 A1* | 10/2014 | Mizuhashi | ............ | G06F 3/0416 |
| | | | | 345/174 |
| 2015/0116263 A1* | 4/2015 | Kim | ........................ | G06F 3/044 |
| | | | | 345/174 |
| 2016/0188087 A1 | 6/2016 | Sun et al. | | |
| 2016/0188091 A1 | 6/2016 | Sun et al. | | |
| 2016/0291784 A1 | 10/2016 | Zhai | | |
| 2016/0320886 A1* | 11/2016 | Kim | ...................... | G06F 3/0412 |
| 2016/0328072 A1 | 11/2016 | Yang | | |
| 2017/0115802 A1 | 4/2017 | Sun et al. | | |

* cited by examiner

TOUCH PANELS

BACKGROUND OF THE INVENTION

1. Field of the Invention

The present disclosure relates to touch technology, and more particularly to a touch panel.

2. Discussion of the Related Art

Liquid crystal device (LCD) is the most widely adopted display device, and have been incorporated in the display having high resolution, such as mobile phones, PDAs, digital cameras, displays for computers and notebooks. In addition, with the development of liquid crystal display, user demands toward display performance, outlook design and human-machine interfaces have been proposed. Touch technology has been a main trend due to attributes, such as easy to use, endurable, and easy to communicate.

Touch technology mainly includes single-touch and multi-touch solutions. Single-touch solution is only capable of identifying one touch point, that is, single-touch solution cannot identify two points touched at the same time. Multi-touch solution mainly includes two tasks. One of the tasks relate to collecting the multi-points signals, and the other one is to identify the signals for each of the points, i.e., the gesture. As such, the touch performed by five fingers may be identified. In addition, multi-touch may further enhance the reliability of the touch panel, and may satisfy a variety of applications.

Multi-touch solution may be realized by mutual capacitive touch panel. As shown in FIG. 1, the mutual capacitive touch panel adopts ITO to manufacture at least one horizontal electrode 11 and at least one vertical electrode 12 on the surface of the glass. Each of the horizontal electrodes 11 are lead out by Tx driving wirings, and each of the vertical electrode 12 are lead out by Rx driving wirings. The capacitance is generated at the intersection of the horizontal electrode 11 and the vertical electrode 12, that is, the horizontal electrode 11 and the vertical electrode 12 are respectively two poles of the capacitance. When the finger touches the touch panel, the coupling between the horizontal electrode 11 and the vertical electrode 12 around the touch point is changed, and the capacitance amount between the two electrodes is also changed. By detecting the amount of the mutual capacitance, the touch driving signals are sent from the Tx wiring to the horizontal electrode 11 in sequence, and all of the vertical electrodes 12 receive the signals simultaneously. In addition, the received signals are outputted by the Rx wirings so as to obtain the amount of the capacitance of the intersection of the horizontal electrode 11 and the vertical electrode 12, that is, the capacitance of the two-dimensional plane of the touch panel. The coordinate of each of the touch points may be calculated on the basis of the changed amount of the two-dimensional capacitance. Thus, even there are a plurality of touch points, the real coordinates of each of the touch points may be calculated, such that the multi-touch control may be realized.

However, as shown in FIG. 1, with respect to conventional touch panel, each of the horizontal electrodes 11 connects to one Tx driving wiring, that is, the number of the horizontal electrodes 11 is the same with the number of the Tx driving wirings. As the Tx driving wirings are arranged around the border, a great amount of the Tx driving wirings may against the narrow border design.

SUMMARY

The present disclosure relates to a touch panel for reducing the number of the driving wirings for inputting touch driving signals, which is beneficial to the narrow border design.

In one aspect, a touch panel includes: a first strobe circuit, at least two touch electrodes arranged along a row direction, and at least two wirings connecting with each of the touch electrodes; the first strobe circuit includes at least two first ends and at least two second ends, one of the first end is configured for providing touch driving signals, each of the second ends directly or indirectly connects with one wiring, a number of the first ends is smaller than the number of the second ends, and the first end for providing the touch driving signals selectively connects to one of the second ends; wherein the touch panel further includes a first voltage line, a second voltage line, and at least one first control signals line, and the first strobe circuit includes at least two first switch circuits; the first voltage line is configured for inputting a first voltage forming the touch driving signals, and the second voltage line is configured for inputting a second voltage; each of the first switch circuits includes a first voltage input end, a second voltage input end, a first output end, and at least one first control signals input ends, the first voltage input ends of the at least two first switch circuits are connected to operate as the first end of the first strobe circuit for providing the touch driving signals, and the first end connects to the first voltage line, the second voltage input ends of the at least two first switch circuits are connected to operate as the other first end of the first strobe circuit, and the other first end connects to the second voltage line, the first output end of each of the first switch circuits operates as the second end of the first strobe circuit, and the second end connects to one end of the wiring, the first output end of different first switch circuits connect to different wirings, at least one first control signals input ends of each of the first switch circuits connect to the first control signals line one by one; the first control signals line inputs control signals to the first control signals input ends such that the first output end of each of the first switch circuits selectively connects with the first voltage line or the second voltage line, when the first output end of one of the first switch circuit connects with the first voltage line, the first output ends of the other first switch circuits are not connected with the first voltage line; and the touch electrode operates as a common electrode of the touch panel.

Wherein each of the first switch circuits includes at least one first switch unit and at least one second switch unit; the first switch unit includes at least one first switch components, the at least one first switch components are serially connected, one end of the serial branch of the at least one first switch components connects to the first voltage input end of the first switch circuit, and the other end of the serial branch of the at least one first switch components connects to the first output end of the first switch circuits, control ends of the at least one first switch components connects to the at least one first control signals input ends of the first switch circuits one by one; the second switch unit includes at least one second switch components connected in parallel, one end of the at least one second switch components connects to the first output end of the first switch circuit, and the other end of the at least one second switch components connects to the second voltage input end of the first switch circuit, the control ends of the at least one second switch components connect to the at least one first control signals input ends one by one; wherein the control signals for respectively turning on the first switch component and the second switch component connected with the same first control signals input end are opposite to each other, at least one first switch component and at least one second switch component within at least one first switch circuit connects to the same first control signals input end by an inverter, locations of the first switch components connected with the inverter are different with respect to the serial branch of different first switch circuits, and the locations of the second switch components connected with the inverter are different with respect to the second switch components connected in parallel of different first switch circuits.

Wherein a number of the touch electrodes and the number of the first switch circuits are m, and the number of the first control signals lines, the first control signals input ends of each of the first switch circuits, the first switch components of each of the first switch circuits, and the second switch components of each of the first switch circuits are n, and m and n satisfy the equation: $m=2^n-1$, n is an integer and $n \geq 1$.

Wherein at least one first switch component is a PMOS transistor, and at least one second switch component is a NMOS transistor.

Wherein the touch panel further includes a second strobe circuit, a third voltage line, a fourth voltage line, and at least one second control signals line, the second strobe circuit includes two third ends, at least two fourth ends, and at least two second switch circuits, wherein one of the third ends is configured for providing the touch driving signals; the third voltage line is configured for inputting a first voltage, and the fourth voltage line is configured for inputting a second voltage; each of the second switch circuits includes a third first voltage input end, a fourth voltage input end, a second output end, and at least one second control signals input end, the third voltage input ends of the at least two second switch circuits are connected to operate as a third end of the second strobe circuit for providing the touch driving signals, and the third end connects to the third voltage line, the fourth voltage input ends of the at least two second switch circuits are connected to operate as the other third end of the second strobe circuit, and the other third end connects to the fourth voltage line, the second output end of each of second first switch circuits operates as the fourth end of the second strobe circuit, and the fourth end connects to one end of the wiring, the second output ends of different second switch circuits connect to different wirings, the second control signals input ends of each of the second switch circuits connect to at least one second control signal line one by one; and the second control signal line respectively inputs the control signals to the second control signals input ends such that the second output end of each of the second switch circuits selectively connects with the third voltage line or the fourth voltage line, when the first output end of one of the second switch circuit connects with the third voltage line, the second output ends of the other second switch circuit are not connected with the third voltage line.

Wherein the second switch circuit includes at least one third switch unit and at least one fourth switch unit; the third switch unit includes at least one third switch components serially connected, one end of the serial branch of the at least one third switch components connects to the third voltage input end of the second switch circuit, and the other end of the serial branch of the at least one third switch components connects to the second output end of the second switch circuits, control ends of the at least one third switch components connect to the at least one second control signals input ends of the second switch circuits one by one; the fourth switch unit includes at least one fourth switch components connected in parallel, one end of the at least one fourth switch components connects to the second output end of the second switch circuit, and the other end of the at least one fourth switch components connect to the second voltage input end of the second switch circuit, the control ends of the at least one fourth switch components connect to the at least one second control signals input ends of the second switch circuit one by one; wherein the control signals for respectively turning on the third switch component and the fourth switch component connected with the same second control signals input end are opposite to each other, at least one third switch component and at least one fourth switch component within at least one second switch circuit connects to the same second control signals input end by an inverter, locations of the third switch components connected with the inverter are different with respect to the serial branch of different second switch circuits, and the locations of the fourth switch components connected with the inverter are different with respect to the fourth switch components connected in parallel of different second switch circuits.

Wherein a number of the touch electrodes and the number of the second switch circuits are m, and the number of the second control signals lines, the second control signals input ends of each of the second switch circuits, the third switch components of each of the second switch circuits, and the fourth switch components of each of the second switch circuits are n, and m and n satisfy the equation: $m=2^n-1$, n is an integer and $n \geq 1$.

Wherein at least one third switch component is a PMOS transistor, and at least one fourth switch component is a NMOS transistor.

In another aspect, a touch panel includes: a first strobe circuit, at least two touch electrodes arranged along a row direction, and at least two wirings connecting with each of the touch electrodes; and the first strobe circuit includes at least one first ends and at least two second ends, one of the first end is configured for providing touch driving signals, each of the second ends directly or indirectly connects with one wiring, a number of the first ends is smaller than the number of the second ends, and the first end for providing the touch driving signals selectively connects to one of the second ends.

Wherein the touch panel further includes a first voltage line, a second voltage line, and at least one first control signals line, and the first strobe circuit includes at least two first switch circuits; the first strobe circuit includes at least two first ends, one of the first end is configured for providing the touch driving signals; the first voltage line is configured for inputting a first voltage forming the touch driving signals, and the second voltage line is configured for inputting a second voltage; each of the first switch circuits includes a first voltage input end, a second voltage input end, a first output end, and at least one first control signals input ends, the first voltage input ends of the at least two first switch circuits are connected to operate as the first end of the first strobe circuit for providing the touch driving signals, and the first end connects to the first voltage line, the second voltage input ends of the at least two first switch circuits are connected to operate as the other first end of the first strobe circuit, and the other first end connects to the second voltage line, the first output end of each of the first switch circuits operates as the second end of the first strobe circuit, and the second end connects to one end of the wiring, the first output end of different first switch circuits connect to different wirings, at least one first control signals input ends of each of the first switch circuits connect to the first control signals line one by one; and the first control signals line inputs control signals to the first control signals input ends such that the first output end of each of the first switch circuits selectively connects with the first voltage line or the second voltage line, when the first output end of one of the first switch circuit connects with the first voltage line, the first output ends of the other first switch circuits are not connected with the first voltage line.

Wherein each of the first switch circuits includes at least one first switch unit and at least one second switch unit; the first switch unit includes at least one first switch components, the at least one first switch components are serially connected, one end of the serial branch of the at least one first switch components connects to the first voltage input end of the first switch circuit, and the other end of the serial branch of the at least one first switch components connects to the first output end of the first switch circuits, control ends of the at least one first switch components connects to the at least one first control signals input ends of the first switch circuits one by one; the second switch unit includes at least one second switch components connected in parallel, one end of the at least one second switch components connects to the first output end of the first switch circuit, and the other end of the at least one second switch components connects to the second voltage input end of the first switch circuit, the control ends of the at least one second switch components connect to the at least one first control signals input ends one by one; wherein the control signals for respectively turning on the first switch component and the second switch component connected with the same first control signals input end are opposite to each other, at least one first switch component and at least one second switch component within at least one first switch circuit connects to the same first control signals input end by an inverter, locations of the first switch components connected with the inverter are different with respect to the serial branch of different first switch circuits, and the locations of the second switch components connected with the inverter are different with respect to the second switch components connected in parallel of different first switch circuits.

Wherein a number of the touch electrodes and the number of the first switch circuits are m, and the number of the first control signals lines, the first control signals input ends of each of the first switch circuits, the first switch components of each of the first switch circuits, and the second switch components of each of the first switch circuits are n, and m and n satisfy the equation: $m=2^n-1$, n is an integer and $n \geq 1$.

Wherein at least one first switch component is a PMOS transistor, and at least one second switch component is a NMOS transistor.

Wherein the touch panel further includes a second strobe circuit, a third voltage line, a fourth voltage line, and at least one second control signals line, the second strobe circuit includes two third ends, at least two fourth ends, and at least two second switch circuits, wherein one of the third ends is configured for providing the touch driving signals; the third voltage line is configured for inputting a first voltage, and the fourth voltage line is configured for inputting a second voltage; each of the second switch circuits includes a third first voltage input end, a fourth voltage input end, a second output end, and at least one second control signals input end, the third voltage input ends of the at least two second switch circuits are connected to operate as a third end of the second strobe circuit for providing the touch driving signals, and the third end connects to the third voltage line, the fourth voltage input ends of the at least two second switch circuits are connected to operate as the other third end of the second strobe circuit, and the other third end connects to the fourth voltage line, the second output end of each of second first switch circuits operates as the fourth end of the second strobe circuit, and the fourth end connects to one end of the wiring, the second output ends of different second switch circuits connect to different wirings, the second control signals input ends of each of the second switch circuits connect to at least one second control signal line one by one; and the second control signal line respectively inputs the control signals to the second control signals input ends such that the second output end of each of the second switch circuits selectively connects with the third voltage line or the fourth voltage line, when the first output end of one of the second switch circuit connects with the third voltage line, the second output ends of the other second switch circuit are not connected with the third voltage line.

Wherein the second switch circuit includes at least one third switch unit and at least one fourth switch unit; the third switch unit includes at least one third switch components serially connected, one end of the serial branch of the at least one third switch components connects to the third voltage input end of the second switch circuit, and the other end of the serial branch of the at least one third switch components connects to the second output end of the second switch circuits, control ends of the at least one third switch components connect to the at least one second control signals input ends of the second switch circuits one by one; the fourth switch unit includes at least one fourth switch components connected in parallel, one end of the at least one fourth switch components connects to the second output end of the second switch circuit, and the other end of the at least one fourth switch components connect to the second voltage input end of the second switch circuit, the control ends of the at least one fourth switch components connect to the at least one second control signals input ends of the second switch circuit one by one; wherein the control signals for respectively turning on the third switch component and the fourth switch component connected with the same second control signals input end are opposite to each other, at least one third switch component and at least one fourth switch component within at least one second switch circuit connects to the same second control signals input end by an inverter, locations of the third switch components connected with the inverter are different with respect to the serial branch of different second switch circuits, and the locations of the fourth switch components connected with the inverter are different with respect to the fourth switch components connected in parallel of different second switch circuits.

Wherein a number of the touch electrodes and the number of the second switch circuits are m, and the number of the second control signals lines, the second control signals input ends of each of the second switch circuits, the third switch components of each of the second switch circuits, and the fourth switch components of each of the second switch circuits are n, and m and n satisfy the equation: $m=2^n-1$, n is an integer and $n \geq 1$.

Wherein at least one third switch component is a PMOS transistor, and at least one fourth switch component is a NMOS transistor.

Wherein the touch electrode operates as a common electrode of the touch panel.

In view of the above, each of the touch electrodes connects to one wiring. The first strobe circuit includes a first end for providing the touch driving signals and at least two second ends, wherein each of the second ends connects to one wiring such that the first end providing the touch driving signals may selectively connect to one of the second ends so as to output the touch driving signals to the wiring connected with the touch electrode via one second end. In this way, the touch driving signals may be respectively provided to the touch electrode so as to realize the touch function of the touch panel. A number of the first ends is smaller than the number of the second ends. That is, the number of the first ends providing the touch driving signals is smaller than the number of the touch electrodes. Thus, the number of the wirings for inputting the touch driving signals to the touch electrodes is smaller than the number of the touch electrodes. Compared to the conventional method, the number of the driving wirings may be reduced, and so does the dimension occupied by the driving wirings, which is beneficial to the narrow border design.

DETAILED DESCRIPTION OF THE EMBODIMENTS

Embodiments of the invention will now be described more fully hereinafter with reference to the accompanying drawings, in which embodiments of the invention are shown.

Figure 1:
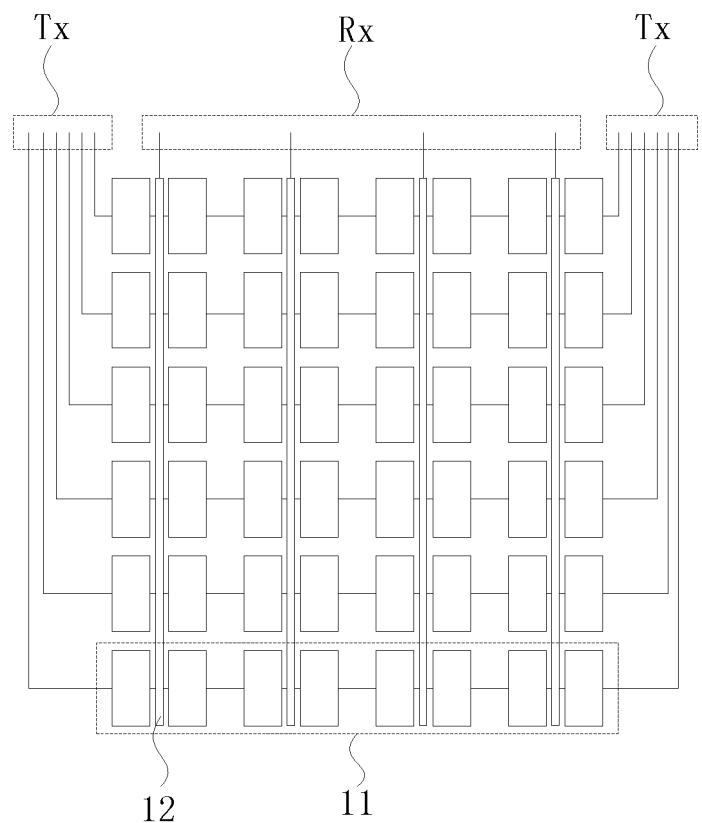
FIG. 1 is a schematic view of the conventional touch panel.
Figure 2:
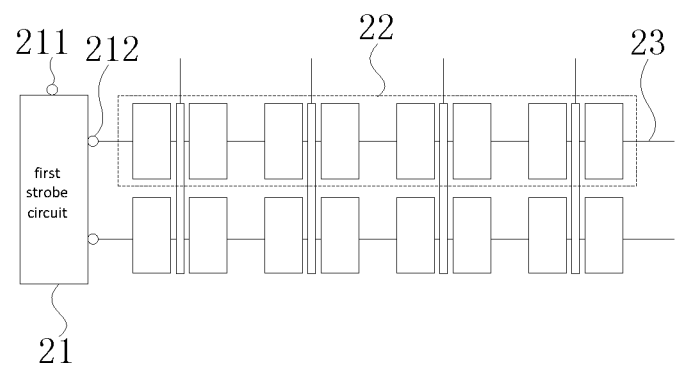
FIG. 2 is a schematic view of the touch panel in accordance with one embodiment.

Referring to FIG. 2, in one embodiment, the touch panel includes a first strobe circuit 21, at least two touch electrodes 22 arranged along a row direction, and at least two wirings 23 respectively connecting with each of the touch electrodes 22.

The first strobe circuit 21 includes at least two first ends 211 and at least two second ends 212. The first end 211 is configured for providing the touch driving signals. The number of the first ends 211 is smaller than the number of the second ends 212. Each of the second ends 212 directly connects with one wiring 23 so as to connect with one touch electrode 22. The first end 211 selectively connects to one of the second ends 212 such that the first strobe circuit 21 providing the touch driving signals selectively connects to one of the touch electrodes 22. In this way, the touch driving signals may be inputted from the first end 211, and then are transmitted to one corresponding touch electrode 22 via the second end 212 connected with the first end 211.

It can be understood that the first strobe circuit 21 may be accomplished by MUX, or by an alternative switch.

In the embodiment, by adopting the first strobe circuit 21, the first end 211 inputting the touch driving signals selectively connects to one of the touch electrode 22. Thus, the touch driving signals may be inputted to the 22 may be inputted to the touch electrode 22 in sequence to realize the touch function. Thus, only one first end 211 is needed for inputting the touch driving signals to two touch electrode 22 in turn. Compared to the conventional method, the number of the driving wirings may be reduced, and so does the dimension occupied by the driving wirings, which is beneficial to the narrow border design.

Figure 3:
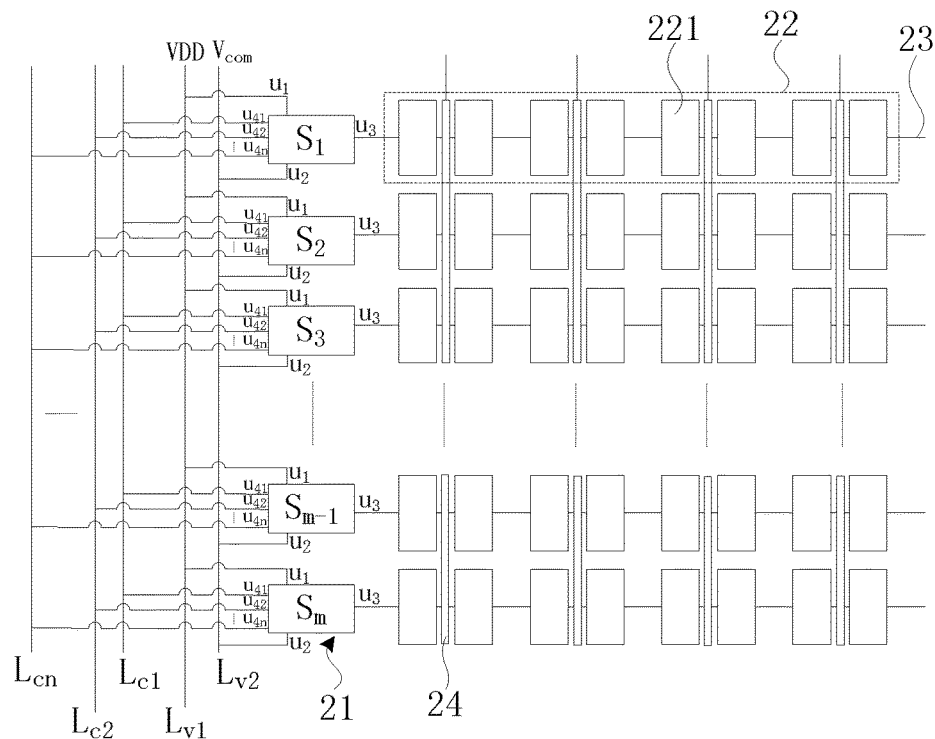
FIG. 3 is a schematic view of the touch panel in accordance with another embodiment.

FIG. 3 is a schematic view of the touch panel in accordance with another embodiment. The touch panel is the liquid crystal panel having a plurality of touch electrodes 22 arranged along the row direction in turn. Each of the wirings 23 connects to one touch electrode 22. In addition, different touch electrode 22 connects to different wiring 23, wherein each of the touch electrodes 22 includes a plurality of touch units 221 arranged along a column direction in turn. The touch units 221 are connected by a corresponding wiring 23 of the touch electrode 22. The wiring 23 includes two opposite ends. In another embodiment, the touch electrode 22 may be a bar-shaped touch electrode.

The touch panel further includes a plurality of sensing electrodes 24. The sensing electrodes 24 and the touch electrodes 22 are arranged in an alternated manner, wherein the touch electrode 22 may operate as a common electrode simultaneously. The driving process includes a liquid crystal driving phase and a touch scanning phase. The liquid crystal driving phase performs the image display, and the touch scanning phase performs the touch function. The touch scanning may be conducted after one frame is displayed and before the next frame is displayed. Alternatively, the touch scanning may be conducted during a display scanning process of one frame. For instance, after a first half of the frame is displayed, the touch scanning may be conducted when displaying a second half of the frame.

During the liquid crystal driving phase, the touch electrode 22 operates as the common electrode to input a common voltage. During the touch scanning phase, the touch electrode 22 is configured for inputting the touch driving signals to realize the touch function.

The touch panel further includes a first voltage line ($L_{v1}$), a second voltage line ($L_{v2}$), and at least one first control signals line. The first strobe circuit 21 includes at least two first switch circuits, wherein m number of touch electrodes 22 is configured, and m is an integer greater or equal to two. The number of the first switch circuit is the same with the number of the touch electrodes 22, i.e., m. The m number of first switch circuits are respectively denoted as $S_1 \sim S_m$. In addition, n number of first control signals lines are configured and are denoted as $L_{c1} \sim L_{cn}$, wherein n is an integer and n≥1.

Wherein m and n satisfy the equation: $m=2^n-1$.

The first voltage line ($L_{v1}$) is configured for inputting a first voltage (VDD), which is a high level voltage for forming the touch driving signals. The second voltage line ($L_{v2}$) is configured for inputting a second voltage ($V_{com}$), which is a low level voltage providing the common voltage for displaying the images. In the embodiment, the touch driving signals are a plurality of direct-current pulse signals, and the voltage of each of the direct-current pulse signals is the first voltage (VDD). That is, the touch driving signals include a plurality of high level signals having the voltage equaling to first voltage (VDD).

The first strobe circuit 21 includes two first ends, wherein one of the first end provides the touch driving signals, and the other one provides the common voltage. Each of the first switch circuits includes a first voltage input end ($u_1$), a second voltage input end ($u_2$), a first output end ($u_3$), and n number of first control signals input ends ($u_{41}$~$u_{4n}$). The first voltage input ends ($u_1$) of m number of first switch circuit ($S_1$~$S_m$) are connected to operate as the first end of the first strobe circuit 21 for providing the touch driving signals, and the first end connects to the first voltage line ($L_{v1}$). That is, the first voltage input end ($u_1$) of the m number of first switch circuits ($S_1$~$S_m$) connect to the first voltage line ($L_{v1}$). The second voltage input ends ($u_2$) of the m number of the first switch circuits ($S_1$~$S_m$) are connected to operate as the other first end of the first strobe circuit 21 connecting to the second voltage line ($L_{v2}$). That is, the second voltage input ends ($u_2$) of the m number of first switch circuits ($S_1$~$S_m$) connect to the second voltage line ($L_2$). The first output end ($u_3$) of each of the first switch circuit operates as the second end 212 of the first strobe circuit 21 connecting to one end of the wiring 23, the first control signals input ends ($u_{41}$~$u_{4n}$) of each of the n number of first switch circuits connect to the n number of first control signals line one by one, wherein the first output end ($u_3$) of different first switch circuit connect to different wirings.

In the embodiment, n number of first control signals line ($L_{c1}$~$L_{cn}$) respectively inputs control signals to the n number of first control signals input ends ($u_{41}$~$u_{4n}$) of each of the first switch circuit such that the first output end ($u_3$) of each of the first switch circuits selectively connects with the first voltage line ($L_{v1}$) or the second voltage line ($L_{v2}$). That is, the first output end ($u_3$) selectively connects with one of the two first ends of the first strobe circuit 21, wherein when the first output end ($u_3$) connects with the first voltage line ($L_{v1}$), the first voltage (VDD) is transmitted to the wiring 23 connected with the first output end ($u_3$) so as to provide the first voltage (VDD) to the touch electrode 22 connected with the wiring 23. When the first output end ($u_3$) connects with the second voltage line ($L_2$), the second voltage ($V_{com}$) is transmitted to the wiring 23 connected with the first output end ($u_3$) so as to provide the second voltage ($V_{com}$) to the touch electrode 22 connected with the wiring 23.

In addition, the control signals configure the first output end ($u_3$) of one of the switch circuits to connect with the first voltage line ($L_{v1}$), and the first output end ($u_3$) of other switch circuits not to connect with the first voltage line ($L_{v1}$). In this way, the first voltage (VDD) is transmitted to the touch electrodes 22 in turn.

Figure 4:
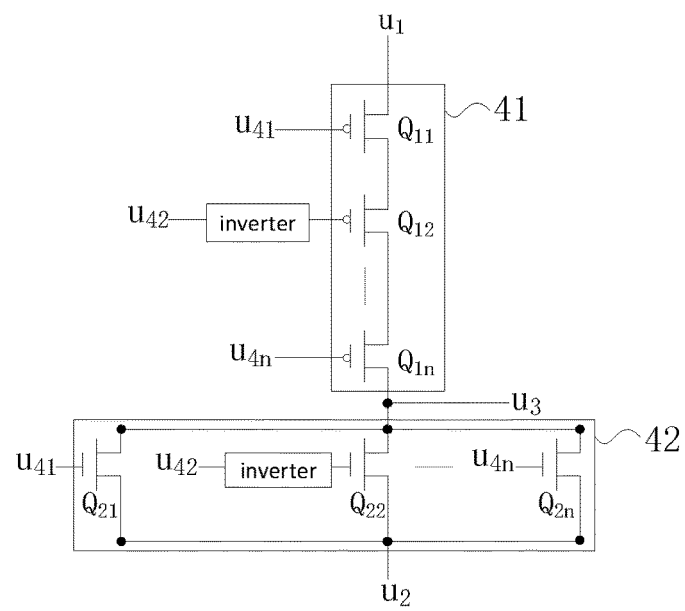
FIG. 4 is a circuit diagram of the first switch circuit of the touch panel in FIG. 3.

FIG. 4 is a circuit diagram of the first switch circuit of the touch panel in FIG. 3. In the embodiment, each of the first switch circuits includes a first switch unit 41 and a second switch unit 42. The first switch unit 41 includes n number of first switch components ($Q_{11}$~$Q_{1n}$), and the second switch unit 42 includes n number of second switch components ($Q_{21}$~$Q_{2n}$), wherein n is an integer greater than or equal to one.

The n number of the first switch components ($Q_{11}$~$Q_{1n}$) are serially connected, one end of the serial branch of the n number of the first switch components ($Q_{11}$~$Q_{1n}$) connects to the first voltage input end ($u_1$) of the first switch circuit, and the other end of the serial branch of the n number of the first switch components ($Q_{11}$~$Q_{1n}$) connects to the first output end ($u_3$) of the first switch circuits, control ends of the n number of the first switch components ($Q_{11}$~$Q_{1n}$) connects to the n number of the first control signals input ends ($u_{41}$~$u_{4n}$) of the first switch circuits one by one, wherein when there is only one first switch component, the first switch component is serially connected between the first voltage input end ($u_1$) and the first output end ($u_3$).

N number of the second switch components ($Q_{21}$~$Q_{2n}$) are connected in parallel. One end of the n number of the second switch components ($Q_{21}$~$Q_{2n}$) connect to the first output end ($u_3$) of the first switch circuit, and the other end of the n number of the second switch components ($Q_{21}$~$Q_{2n}$) connect to the second voltage input end ($u_2$) of the first switch circuit. The control ends of the n number of the second switch components ($Q_{21}$~$Q_{2n}$) connect to the n number of the first control signals input ends ($u_{41}$~$u_{4n}$) one by one.

In the embodiment, at least one of the first switch component and at least one of the second switch component of the at least one of the m number of the first switch circuits connect to the same first control signal input end via an inverter. As shown in FIG. 4, the control ends of the first switch component ($Q_{12}$) and the second switch component ($Q_{22}$) connects to the same first control signals input end ($u_{42}$), wherein the control ends of the first switch component ($Q_{12}$) and the second switch component ($Q_{22}$) may connect to the first control signals input end ($u_{42}$) via the same or different inverter, wherein the inverter may be accomplished by one NAND gate.

In addition, the locations of the first switch components connected with the inverter are different with respect to different first switch circuits, and the locations of the second switch components connected with the inverter are different within the n number of second switch components ($Q_{21}$~$Q_{2n}$) connected in parallel. In addition, with respect to different first switch circuits, the number of the first switch components connected with the inverter may be the same or different. Also, the number of the second switch components connected with the inverter may be the same or different. As shown in FIG. 4, the first switch component connected with the inverter is the second first switch component within the serially connected branch, and the second switch component connected with the inverter is the 2st second switch component within the n number of the second switch components connected in parallel. In another example, the first switch components connected with the inverter are the first and the second first switch components within the serially connected branch, and the second switch components connected with the inverter are the 1st and the 2st second switch component within the n number of the second switch components connected in parallel. The process of selecting the first/second switch component connected with the inverter will be described hereinafter.

The control signals for turning on the first switch component and the second switch component connected with the same first control signals input end are opposite to each other, i.e., logically. In the embodiment, the n number of first switch components ($Q_{11}$~$Q_{1n}$) are PMOS transistors, and the control signals for turning on the first switch component are low level. That is, when the control signals of the control end are at the low level, the first switch component is turned on, and when the control signals of the control end are at the high level, the first switch component is turned off. The n number of the second switch components ($Q_{21}$~$Q_{2n}$) are NMOS transistor, and the control signals for turning on the second switch component are high level. That is, when the control signals of the control end are at the low level, the second switch component is turned off, and when the control signals of the control end are at the high level, the first switch component is turned on In other embodiments, the first switch component may be a P-type triode or other controllable switch, and the second switch component may be a N-type triode or other controllable switch.

The high level of the control signals is denoted by logic "1", and the low level of the control signals is denoted by logic "0." In the embodiment, m=$2^n$−1, m relates to the number of the touch electrodes 22, i.e., the number of the first switch circuits, n relates to the number of the first and the second switch components within each of the first switch circuits, i.e., the number of the first control signals lines. The n number of control signals are inputted from the n number of first control signals line ($L_{c1} \sim L_{cn}$). During the touch scanning phase, the m number of the first switch circuit ($S_1 \sim S_m$) are controlled to provide the touch driving signals to the m number of the touch electrodes 22 in turn. During the liquid crystal displaying phase, the m number of first switch circuit ($S_1 \sim S_m$) are controlled to provide the common voltage to the m number of the touch electrodes 22. Thus, the touch electrodes 22 of different number may be driven only by configuring the number of the first switch components and the second switch components within each of the first switch circuit. For instance, when the number of the first switch components and the second switch components are three, seven touch electrodes 22 may be driven, and only 3 first control signals line, one first voltage line ($L_{v1}$), and one second voltage line ($L_{v2}$) are needed. When the number of the first switch components and the second switch components are five, 31 touch electrodes 22 may be driven, and only 5 first control signals line, one first voltage line ($L_{v1}$), and one second voltage line ($L_{v2}$) are needed The process of applying the touch driving signals toward the touch electrodes 22 and providing the common voltage needed when displaying the images via the first switch circuit will be described hereinafter.

Figure 5:
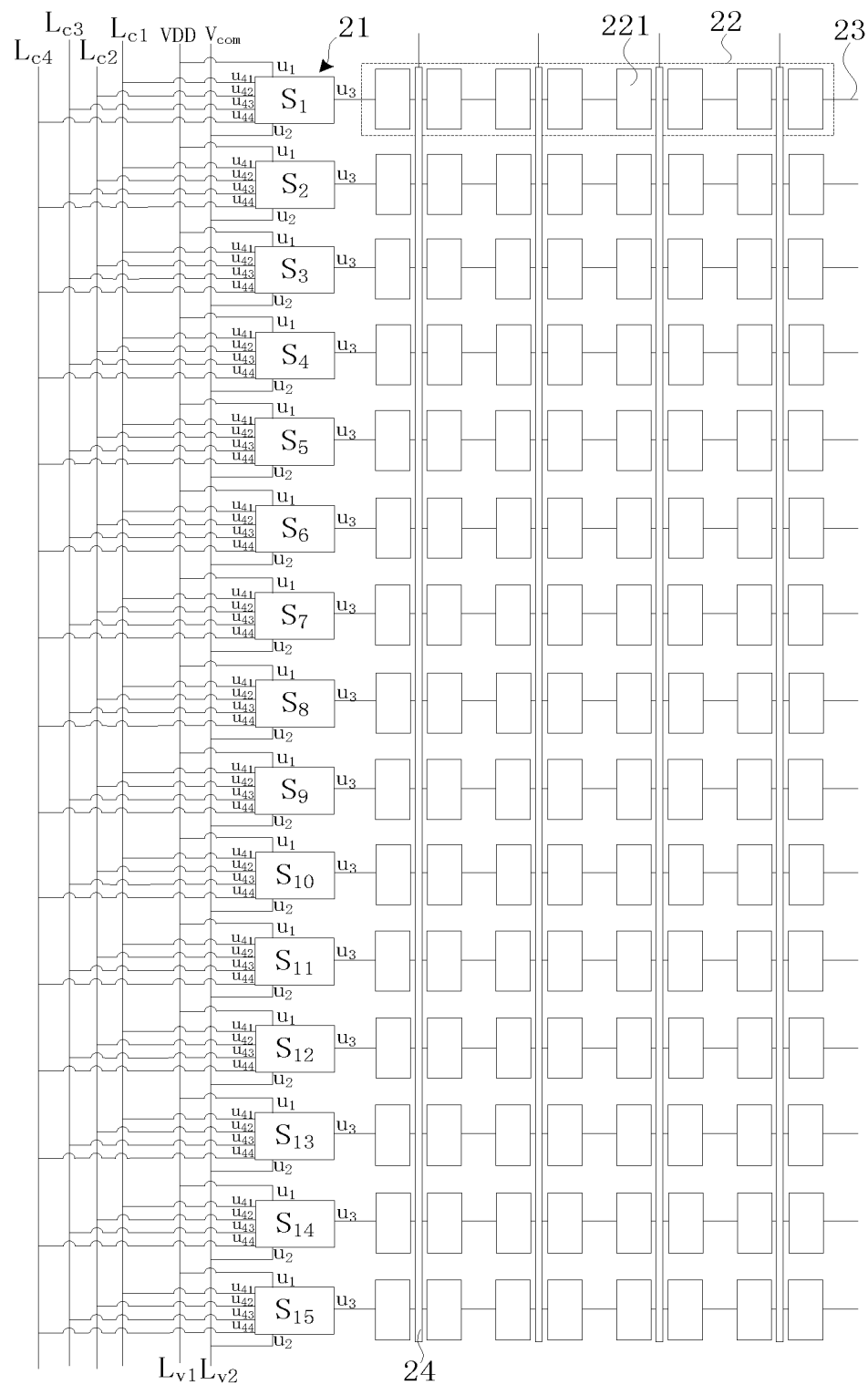
FIG. 5 is a schematic view of the touch panel in accordance with one embodiment.

FIG. 5 is a schematic view of the touch panel in accordance with one embodiment. In the embodiment, the touch panel includes 15 touch electrodes 22 and 15 first switch circuit. That is, m=15. The 15 first switch circuit are denoted as $S_1 \sim S_{15}$. The touch panel includes 4 first control signals lines, which are denoted as $L_1 \sim L_{c4}$.

Figure 6:
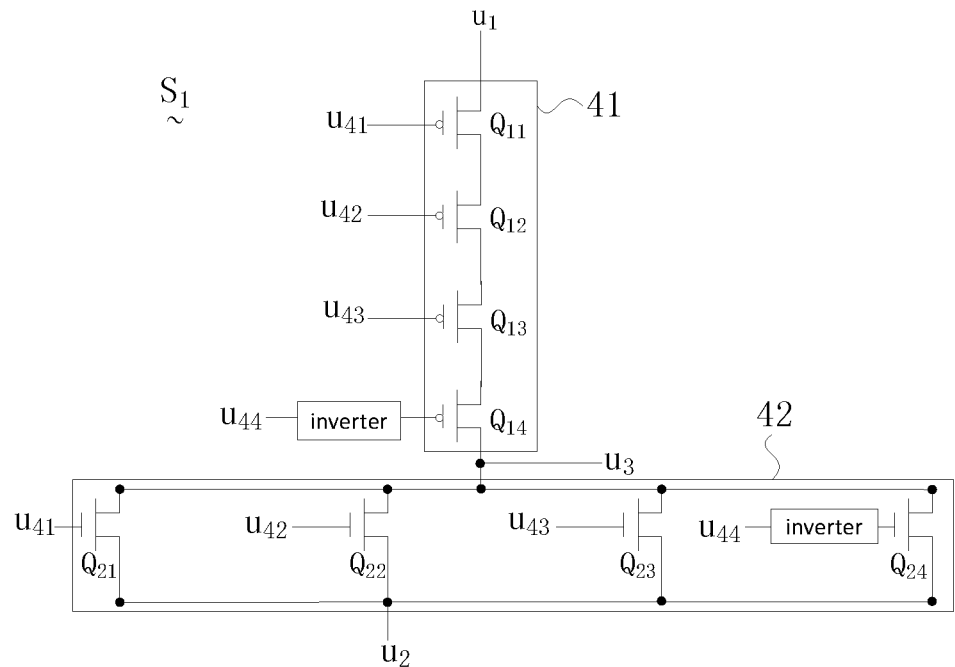
FIG. 6 is a schematic view of the first switch circuit $S_1$ of the touch panel of FIG. 5.
Figure 7:
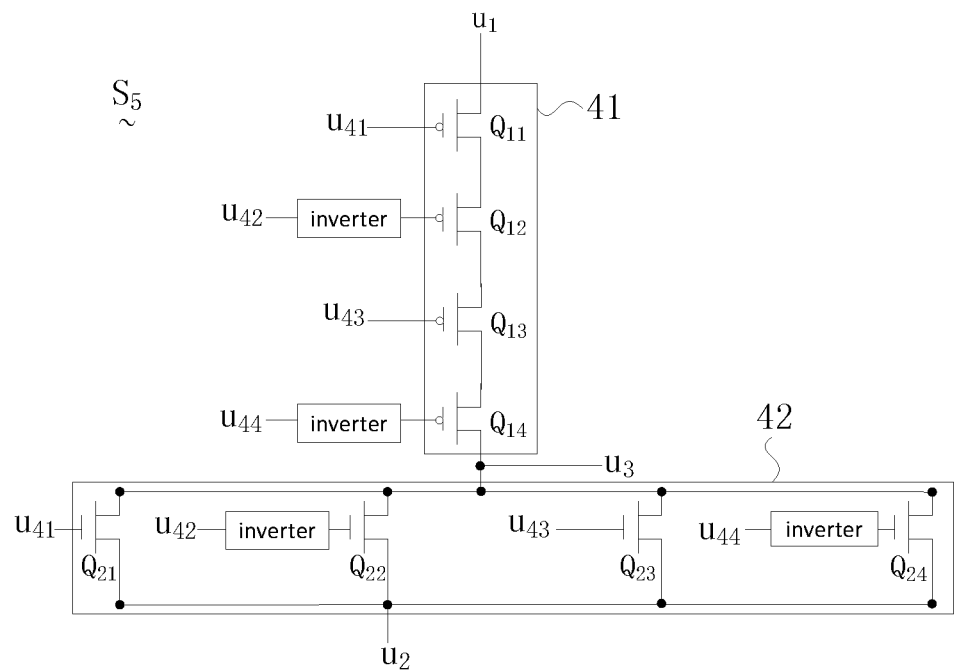
FIG. 7 is a schematic view of the first switch circuit $S_5$ of the touch panel of FIG. 5.
Figure 8:
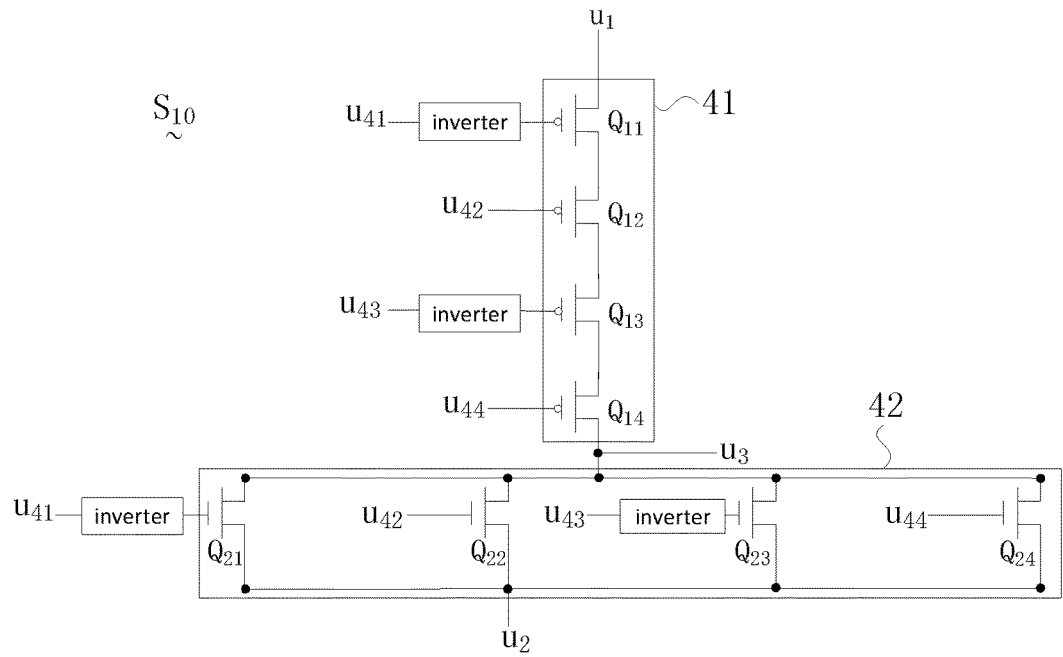
FIG. 8 is a schematic view of the first switch circuit $S_{10}$ of the touch panel of FIG. 5.
Figure 9:
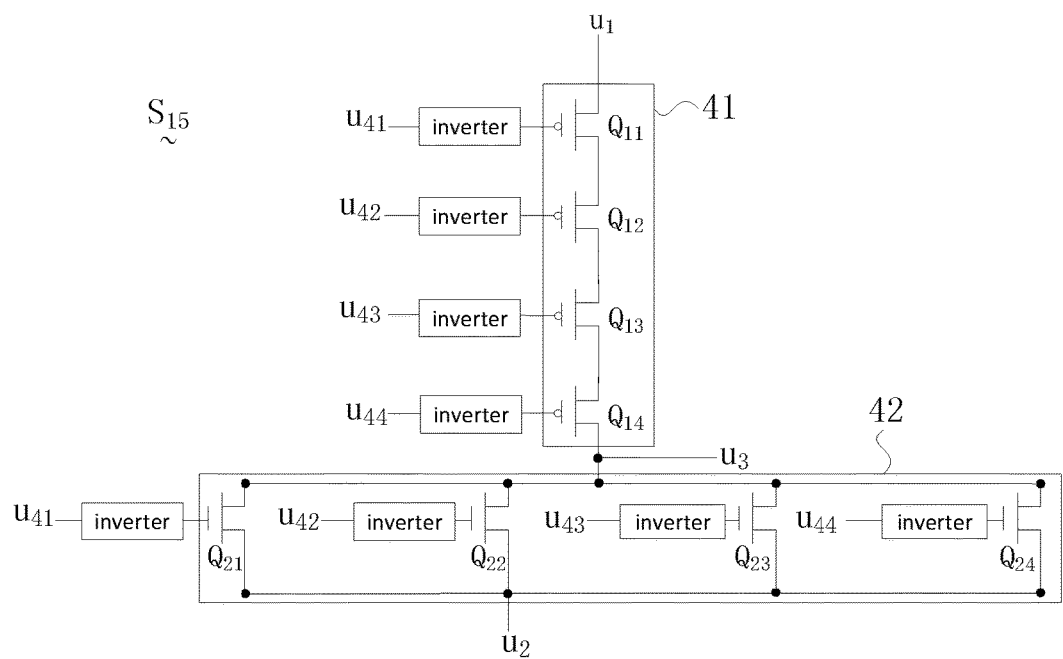
FIG. 9 is a schematic view of the first switch circuit $S_{15}$ of the touch panel of FIG. 5.

FIG. 6 is a schematic view of the first switch circuit $S_1$ of the touch panel of FIG. 5. FIG. 7 is a schematic view of the first switch circuit $S_5$ of the touch panel of FIG. 5. FIG. 8 is a schematic view of the first switch circuit $S_{10}$ of the touch panel of FIG. 5. FIG. 9 is a schematic view of the first switch circuit $S_{15}$ of the touch panel of FIG. 5.

The first switch unit 41 within each of the first switch circuits includes four first switch components serially connected, i.e., the first switch components ($Q_{11} \sim Q_{14}$). The first switch components ($Q_{11} \sim Q_{14}$) are PMOS transistors. The second switch unit 42 within each of the first switch circuits includes four second switch components connected in parallel, i.e., the second switch component ($Q_{21} \sim Q_{24}$). The second switch component ($Q_{21} \sim Q_{24}$) are NMOS transistors. The four first switch components ($Q_{11} \sim Q_{14}$) connect to the four first control signals input ends ($u_{41} \sim u_{4n}$) one by one, and the four second switch component ($Q_{21} \sim Q_{24}$) connect to the four first control signals input ends ($u_{41} \sim u_{4n}$) one by one. That is, the control ends of the first switch component ($Q_{11}$) and the second switch component ($Q_{21}$) connect to the first control signals input end ($u_{41}$), the control ends of the first switch component ($Q_{12}$) and the second switch component ($Q_{22}$) connect to the first control signals input end ($u_{42}$), and the other connection relationship may be conceived in a similar manner.

Each of the first switch circuits includes the inverter. The first switch components connected with the inverter within different first switch circuits are different, and the second switch components connected with the inverter within different first switch circuits are also different. For instance, as shown in FIG. 6, with respect to the 1st first switch circuit $S_1$, the control ends of the 4st first switch component ($Q_{14}$) and the 4st second switch component ($Q_{24}$) connect to the 4st first control signals input ends ($u_{44}$) via the inverter. As shown in FIG. 7, with respect to the 5st first switch circuit $S_1$, the control ends of the 2st first switch component ($Q_{12}$) and the 2st second switch component ($Q_{22}$) connect to the 2st first control signals input ends ($u_{42}$) via the inverter, and the control ends of the 4st first switch component ($Q_{14}$) and the 4st second switch component ($Q_{24}$) connect to the 4st first control signals input ends ($u_{44}$) via the inverter.

As shown in FIG. 8, with respect to the tenth first switch circuit $S_{10}$, the control ends of the 1st first switch component ($Q_{11}$) and the 1st second switch component ($Q_{21}$) connect to the 1st first control signals input ends ($u_{41}$) via the inverter, and the control ends of the 3st first switch component ($Q_{13}$) and the 2st second switch component ($Q_{23}$) connect to the 3st first control signals input ends ($u_{43}$) via the inverter.

As shown in FIG. 9, with respect to the fifteenth first switch circuit $S_{15}$, the control ends of the four first switch component ($Q_{11} \sim Q_{41}$) and the four second switch components ($Q_{21} \sim Q_{24}$) connect to the four first control signals input ends ($u_{41} \sim u_{4n}$) by the inverter one by one.

The above examples relate to the four first switch circuits having the first switch components and the second switch components connected with the inverter, and the configuration regarding the 15 first switch circuits may be referenced in accordance with Table. 1.

The touch scanning phase includes 15 periods, which are respectively denoted as t1~t15. Table. 1 relates to the logic truth table of the control signals received from the first control signals input ends ($u_{41} \sim u_{4n}$) of the first switch circuit within each of the periods, wherein the control signals received from the four first control signals input ends ($u_{41} \sim u_{4n}$) are also the control signals from the first control signals input ends ($L_{c1} \sim L_{c4}$).

TABLE 1

Logic truth table of the control signals during the touch scanning phase

| Period | first switch circuit | $u_{41}$ | $u_{42}$ | $u_{43}$ | $u_{44}$ | $u_3$ |
|---|---|---|---|---|---|---|
| t1 | $S_1$ | 0 | 0 | 0 | 1 | 1 |
| t2 | $S_2$ | 0 | 0 | 1 | 0 | 1 |
| t3 | $S_3$ | 0 | 0 | 1 | 1 | 1 |
| t4 | $S_4$ | 0 | 1 | 0 | 0 | 1 |
| t5 | $S_5$ | 0 | 1 | 0 | 1 | 1 |
| t6 | $S_6$ | 0 | 1 | 1 | 0 | 1 |
| t7 | $S_7$ | 0 | 1 | 1 | 1 | 1 |
| t8 | $S_8$ | 1 | 0 | 0 | 0 | 1 |
| t9 | $S_9$ | 1 | 0 | 0 | 1 | 1 |
| t10 | $S_{10}$ | 1 | 0 | 1 | 0 | 1 |
| t11 | $S_{11}$ | 1 | 0 | 1 | 1 | 1 |
| t12 | $S_{12}$ | 1 | 1 | 0 | 0 | 1 |
| t13 | $S_{13}$ | 1 | 1 | 0 | 1 | 1 |
| t14 | $S_{14}$ | 1 | 1 | 1 | 0 | 1 |
| t15 | $S_{15}$ | 1 | 1 | 1 | 1 | 1 |
| t0 | $S_1 \sim S_{15}$ | 0 | 0 | 0 | 0 | 0 |

As shown in Table. 1, "0" represents the low level, and "1" represents the high level. According to Table. 1, during the period "t1", the first output end ($u_3$) of the first switch circuit ($S_1$) outputs the touch driving signals to one connected wiring 23, and the other first switch circuits ($S_2 \sim S_{15}$) do not output the touch driving signals. During the period "t2", the first output end ($u_3$) of the second switch circuit ($S_2$) outputs the touch driving signals to one connected wiring 23, and the other first switch circuit, $S_1, S_3 \sim S_{15}$ do not output the touch driving signals, and the principle may be adopted to conceive the configuration with respect to other switch circuits. When the touch scanning process is completed, the process goes to period "t0" of the liquid crystal displaying phase, the first output end ($u_3$) of the first switch circuit ($S_2$~$S_{15}$) output the common voltage.

Thus, within each of the periods, the four first control signals input ends ($L_{c1}$~$L_{c4}$) output the corresponding control signals. In this way, within each of the periods, the first output end ($u_3$) of only one first switch circuit outputs the touch driving signals.

Within the period "t1", the control signals inputted from the first control signals input ends ($u_{41}$~$u_{44}$) are respectively 0, 0, 0, and 1 so as to select the first switch circuit ($S_1$) to output the touch driving signals. At this moment, the control signals inputted from the 4st first control signals input ends ($u_{44}$) is logical "1." Thus, within the first switch circuit ($S_1$), the control ends of the 4st first switch component ($Q_{14}$) and the 4st first switch components ($Q_{24}$) connected with the 4st first control signals input ends ($u_{44}$) connect to the 4st first control signals input ends ($u_{44}$) via the inverter.

Within the period "t2", the control signals inputted from the first control signals input ends ($u_{41}$~$u_{44}$) are respectively 0, 0, 1, and 0 so as to select the first switch circuit ($S_2$) to output the touch driving signals. At this moment, the control signals inputted from the 3st first control signals input ends ($u_{43}$) is logical "1." Thus, within the first switch circuit ($S_2$), the control ends of the 3st first switch component ($Q_{13}$) and the 3st first switch components ($Q_{23}$) connected with the 3st first control signals input ends ($u_{43}$) connect to the 3st first control signals input ends ($u_{43}$) via the inverter.

Within the period "t3", the control signals inputted from the first control signals input ends ($u_{41}$~$u_{44}$) are respectively 0, 0, 1, and 0 so as to select the first switch circuit ($S_3$) to output the touch driving signals. At this moment, the control signals inputted from the 3st first control signals input ends ($u_{43}$) and the 4st first control signals input ends ($u_{44}$) are logical "1." Thus, within the first switch circuit ($S_3$), the control ends of the 3st first switch component ($Q_{13}$) and the 3st first switch components ($Q_{23}$) connected with the 3st first control signals input ends ($u_{43}$) connect to the 3st first control signals input ends ($u_{43}$) via the inverter. In addition, the control ends of the 4st first switch components ($Q_{14}$) and the 4st second switch component ($Q_{24}$) connected with the 4st first control signals input ends ($u_{44}$) connect to the 4st first control signals input ends ($u_{44}$) via the inverter.

Within the period "t4", the control signals inputted from the first control signals input ends ($u_{41}$~$u_{44}$) are respectively 0, 1, 0, and 0 so as to select the first switch circuit ($S_4$) to output the touch driving signals. At this moment, the control signals inputted from the 2st first control signals input ends ($u_{42}$) is logical "1." Thus, within the first switch circuit ($S_4$), the control ends of the 2st first switch component ($Q_{12}$) and the 2st first switch components ($Q_{22}$) connected with the 2st first control signals input ends ($u_{42}$) connect to the 2st first control signals input ends ($u_{42}$) via the inverter.

Within the period "t5", the control signals inputted from the first control signals input ends ($u_{41}$~$u_{44}$) are respectively 0, 1, 0, and 1 so as to select the first switch circuit ($S_5$) to output the touch driving signals. At this moment, the control signals inputted from the 2st first control signals input ends ($u_{42}$) and the 2st first control signals input ends ($u_{44}$) are logical "1." Thus, within the first switch circuit ($S_5$), the control ends of the 2st first switch component ($Q_{12}$) and the 2st first switch components ($Q_{22}$) connected with the 2st first control signals input ends ($u_{42}$) connect to the 2st first control signals input ends ($u_{42}$) via the inverter. In addition, the control ends of the 4st first switch components ($Q_{14}$) and the 4st second switch component ($Q_{24}$) connected with the 4st first control signals input ends ($u_{44}$) connect to the 4st first control signals input ends ($u_{44}$) via the inverter.

The first switch component and the second switch component within the first switch circuits ($S_6$~$S_{15}$) connecting to the inverter may be conceived in a similar way. According to the logic truth table (Table. 1), the first switch component and the second switch component connected with the first control signals input end having the input control signals of logical "1" are connected with the inverter.

By connecting the inverter with different first switch circuits, the touch driving signals or the common electrode are selectively provided to the touch electrode 22. In addition, during the touch scanning phase, the touch driving signals may be selectively inputted to one touch electrode 22. The first switch circuit ($S_1$) is taken as one example hereinafter:

During the period "t1", the control signals of the four first control signals input ends ($L_{c1}$~$L_{c4}$) are respectively 0 (low), 0 (low), 0 (low), and 1 (high). That is, the control signals received by the four first control signals input ends ($u_{41}$~$u_{44}$) are respectively 0 (low), 0 (low), 0 (low), and 1 (high).

At this moment, with respect to the first switch circuit ($S_1$), the low level signals received by the three first control signals input ends ($u_{41}$~$u_{43}$) are transmitted directly to the first switch components ($Q_{11}$~$Q_{13}$) and the second switch component ($Q_{21}$~$Q_{23}$). When being controlled by the low level control signals, the first switch components ($Q_{11}$~$Q_{13}$) are in an on-state, and the second switch component ($Q_{21}$~$Q_{23}$) are in an off-state. The high level control signals received from the first control signals input ends ($u_{44}$) transit to be the low level control signals after passing through the inverter, and the low level control signals are transmitted to the control ends of the first switch components ($Q_{14}$) and the second switch component ($Q_{24}$) to turn on the first switch components ($Q_{14}$) and to turn off the second switch component ($Q_{24}$). In this way, the first voltage (VDD) is transmitted to the first voltage input end ($u_1$) of the first switch circuit ($S_1$), and is then transmitted to the first output end ($u_3$) of the first switch circuit ($S_1$) via the serially connected first switch component ($Q_{11}$~$Q_{14}$). The first voltage (VDD) is outputted to the touch electrode 22 connected by the wiring 23 corresponding to the first switch circuit ($S_1$) so as to provide the touch driving signals to the touch electrode 22 connected with the first switch circuit ($S_1$). The four serially connected second switch components ($Q_{21}$~$Q_{24}$) are in the off-state. Thus, the first voltage input end ($u_1$) of the first switch circuit ($S_1$) and the first output end ($u_3$) of the first direction (D1) are disconnected.

With respect to the first switch circuit ($S_1$), only when the control signals of the four first control signals input ends ($u_{41}$~$u_{44}$) are respectively 0, 0, 0, 1, the first output end ($u_3$) outputs the first voltage (VDD). When the control signals are other signals, such as 0, 0, 1, and 0, the first switch component ($Q_{13}$) and the first switch component ($Q_{14}$) of the first direction (D1) are in the off-state. When the channel for transmitting the first voltage (VDD) is disconnected, the second switch component ($Q_{23}$) and the second switch component ($Q_{24}$) are in the on-state, the second voltage ($V_{com}$) is transmitted to the first output end ($u_3$) via the second switch component ($Q_{23}$, $Q_{24}$). Thus, the first switch circuit ($S_1$) outputs the second voltage ($V_{on}$).

In addition, during the period "t1", with respect to other first switch circuit ($S_2$~$S_{15}$), the channel for transmitting the first voltage (VDD) is in the off-state. For instance, with respect to the first switch circuits ($S_5$, $S_{10}$, $S1_5$) in FIGS. 7-9, the control signals are respectively 0, 0, 0 and 1, and thus at least one of the four first switch components ($Q_{11}$~$Q_{14}$) is in the off-state, and thus the serially connected branch is disconnected. As such, the channel for transmitting the first voltage (VDD) is disconnected, and at least one of the second switch components ($Q_{21} \sim Q_{24}$) is in the on-state. Thus, the second voltage ($V_{com}$) may be transmitted to the touch electrode via the second switch component.

During the period "t2", the control signals of the four first control signals input ends ($u_{41} \sim u_{44}$) are respectively 0, 0, 1, and 0. With respect to the second turn-on signals S2, the control ends of the first switch component ($Q_{13}$) and the second switch component ($Q_{23}$) connect to the corresponding first control signals input end ($u_{43}$), and the other first switch components and other second switch components directly connect to the first control signals input ends. The control signals of the control ends of the four first switch components ($Q_{11} \sim Q_{14}$) and the four second switch component ($Q_{21} \sim Q_{24}$) are at the low level, and the four first switch components ($Q_{11} \sim Q_{14}$) are in the on-state. As such, the first voltage (VDD) may be transmitted to the wiring 23 connected with the second turn-on signals S2 to provide the touch driving signals to the corresponding touch electrode 22, and the four second switch components ($Q_{21} \sim Q_{24}$) are in the off-state.

With respect to the first switch circuit ($S_2$), only when the control signals of the four first control signals input ends ($u_{41} \sim u_{44}$) are respectively 0, 0, 1, and 0, the first output end ($u_3$) outputs the first voltage (VDD). When the control signals are other control signals, the first output end ($u_3$) outputs the second voltage ($V_{com}$). The configurations of other first switch circuits ($S_3 \sim S_{15}$) may be conceived in a similar way. The first switch circuit ($S_3$) only outputs the first voltage (VDD) when the control signals are 0, 0, 1, and 1, and the first switch circuit ($S_3$) outputs the second voltage ($V_{com}$) when the control signals are other than the above. The first switch circuit ($S_5$) only outputs the first voltage (VDD) when the control signals are 0, 1, 0, and 1, and the first switch circuit ($S_5$) outputs the second voltage ($V_{com}$) when the control signals are other than the above. The control signals needed by each of the first switch circuits to output the first voltage (VDD) may be conceived in view of Table. 1.

In addition, the touch driving signals relate to a plurality of direct-current pulse signals, and the voltage of each of the direct-current pulse signals is the first voltage (VDD). That is, during the touch scanning phase, the touch driving signals outputted by the first switch circuit within each of the periods are the first voltage (VDD).

Figure 10:
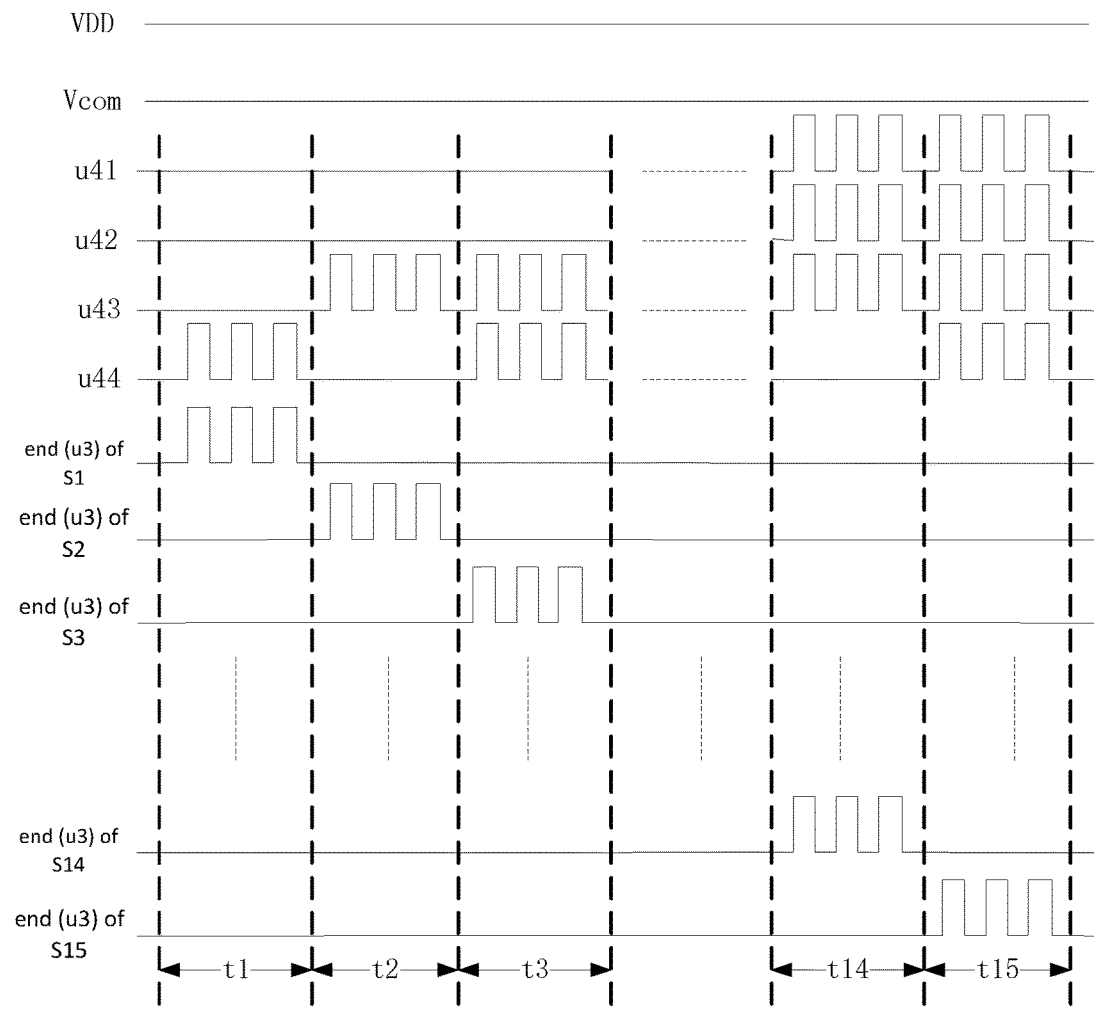
FIG. 10 is a timing diagram of the touch panel of FIG. 5.

FIG. 10 is a timing diagram of the touch panel of FIG. 5. As shown in FIG. 10, during the period "t1", the control signals inputted from the first control signals input end ($u_{44}$) are pulse signals, the first control signals input ends ($u_{41} \sim u_{43}$) inputs the control signals at low level, wherein when the first control signals input end ($u_{44}$) includes the high level signals, the control signals inputted from the first control signals input ends ($u_{41} \sim u_{44}$) are respectively 0, 0, 0 and 1. Thus, the first switch circuit ($S_1$) outputs the first voltage (VDD). When the first control signals input end ($u_{44}$) includes the low level signals, the control signals inputted from the first control signals input ends ($u_{41} \sim u_{44}$) are respectively 0, 0, 0 and 1. The first switch circuit ($S_1$) outputs the second voltage ($V_{com}$). As the control signals inputted from the first control signals input end ($u_{44}$) are the pulse wave signals having alternative high level and low level, correspondingly, the signals outputted by the first switch circuit ($S_1$) within the period "t1" are also the pulse wave signals having alternative first voltage (VDD) and the second voltage ($V_{com}$) so as to obtain a plurality of direct-current pulse signals, i.e., the first voltage (VDD) signals, and to obtain the touch driving signals.

Similarly, the touch driving signals outputted by the corresponding first switch circuit within other periods may be conceived in the same way.

In other embodiments, the touch driving signals may be one direct-current pulse signals. That is, within each of the periods, the touch driving signals outputted by the corresponding first switch circuit are the first voltage (VDD). At this moment, the control signals inputted from the first control signals input end are the direct-current pulse signals.

When the touch scanning process is completed and the process goes to the liquid crystal driving phase, in view of Table. 1, within the period "t0", the control signals inputted by the four first control signals input ends ($u_{41} \sim u_{44}$) are at the low level. As the control ends of the at least one of the first switch component and at least one of the second switch component within each of the first switch circuits connect to the corresponding first control signals input ends, when the control signal inputted by the four first control signals input ends ($u_{41} \sim u_{44}$) are at the low level, at least one of the four first switch components ($Q_{11} \sim Q_{14}$) within each of the first switch circuits is in the off-state such that the serially connected branch where the four first switch components ($Q_{11} \sim Q_{14}$) located is in the disconnected state. Thus, the channel transmitting the first voltage (VDD) is disconnected, and at least one second switch component among the second switch components ($Q_{21} \sim Q_{24}$) within each of the first switch circuits is in the on-state, and the second voltage ($V_{com}$) may be outputted to the touch electrode 22 via the turned-on second switch component. As such, the common voltage is provided to the touch electrode 22.

In view of the above, by adopting the first strobe circuit 21, the touch driving signals may be provided to the touch electrode in turn during the touch scanning phase. In addition, during the liquid crystal driving scanning phase, the common voltage may be provided to the touch electrode. In addition, only one touch driving wiring, i.e., first voltage line and a smaller number of the first control signals lines are needed to provide the touch driving signals to the touch electrodes 22 in sequence. For instance, 4 first control signals lines are capable of driving 15 touch electrodes 22, and five first control signals line are capable of driving 31 touch electrodes 22. Thus, the wirings in a rim of the touch panel may be greatly reduced so as to decrease the space of the border, which is beneficial to the narrow border design.

In the above embodiments, the inverter is configured to control the output of each of the first switch circuits. The first switch components within the first switch unit 41 of each of the first switch circuits are PMOS transistors, and the second switch component of the second switch unit 42 are NMOS transistors. In another embodiment, the inverter is not configured. Instead, the first switch components within the first switch unit are the combination of the transistors of different types, and the second switch components within the second switch unit are the combination of the transistors of different types. The control ends of each of the first switch components and the second switch components connect directly with the corresponding first control signals input ends. For instance, with respect to the first switch circuit ($S_1$), the first switch components ($Q_{11} \sim Q_{13}$) are PMOS transistors, and the first switch components ($Q_{14}$) is the NMOS transistor. The control ends of each of the first switch components directly connect with the corresponding first control signals input end. The second switch components ($Q_{21} \sim Q_{23}$) are the NMOS transistor, and the second switch component ($Q_{24}$) is the PMOS transistor. The control ends of each of the second switch components directly connect with the first control signals input ends. In another example, with respect to the first switch circuit ($S_5$), the first switch component ($Q_{11}$) and the first switch component ($Q_{13}$) are PMOS transistor, and the first switch component ($Q_{12}$) and the first switch component ($Q_{14}$) are NMOS transistor. The first switch component ($Q_{21}$) and the first switch component ($Q_{23}$) are NMOS transistor, and the first switch component ($Q_{22}$) and the first switch component ($Q_{24}$) are PMOS transistor.

Thus, the difference between this embodiment and the above embodiment resides in that, in this embodiment, the type of the transistor of the first switch component and the second switch component of the first control signals input ends connecting with the inverter may be configured. For instance, the first switch component connecting with the inverter is changed from the PMOS transistor to be the NMOS transistor, and the second switch component connecting with the inverter is changed from the NMOS transistor to be the PMOS transistor. In this way, the inverter may be omitted so as to save the cost.

FIG. 5 shows one example of 15 touch electrodes 22. When the number of the touch electrodes 22 is greater than 22, the first strobe circuit 21 may be configured in accordance with the equation: $m=2^n-1$, wherein m relates to the number of the touch electrodes 22 and n is the number of the first switch components and second switch components, i.e., the number of the first control signals lines. For instance, 31 touch electrodes 22 may be driven by configuring 5 first switch components and 5 second switch components. The touch scanning phase is divided into 31 periods, and the first switch component and the switch component needed to be connected with the inverter may be determined by the first control signals input end inputted with the control signals with logical "1."

In another example, a portion of the touch electrodes 22 may be driven by configuring the first strobe circuit 21. For instance, when the touch panel includes 26 touch electrodes 22, the first strobe circuit 21 in FIG. 5 may be configured to input the touch driving signals or the common voltage to the 15 touch electrodes 22 via the first strobe circuit 21, and the remaining 11 touch electrodes 22 may be connected with the driving wirings so as to input the touch driving signals or the common voltage one by one. With such configuration, the number of the driving wirings may be reduced to some extent. Alternatively, the first strobe circuit 21 having different configuration may be adopted to drive the touch electrodes such that the first strobe circuit 21 drives the 15 touch electrodes 22, and the first strobe circuit 21 of different configuration drives 7 touch electrodes 22. In addition, the remaining 4 touch electrodes 22 may be driven by the driving signals inputted by four driving wirings.

Figure 11:
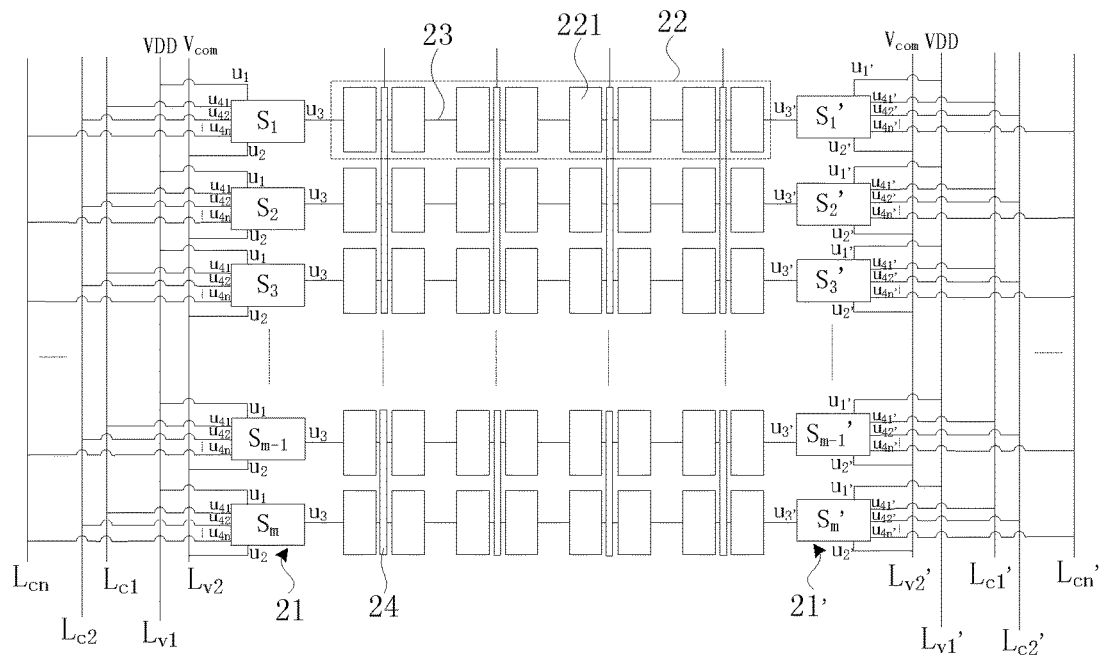
FIG. 11 is a schematic view of the touch panel in accordance with another embodiment.

FIG. 11 is a schematic view of the touch panel in accordance with another embodiment. The components having the same reference numerals operate in the same way. In this embodiment, the touch panel further includes a second strobe circuit 21', a third voltage line ($L_{v1'}$) a fourth voltage line ($L_{v2'}$), and at least one second control signals line. The second strobe circuit 21' includes two third ends, at least two fourth ends, and at least two switch circuits. One of the third end is configured for providing the touch driving signals, wherein the number of the second switch circuit is the same with the number of the touch electrodes 22, which are both m, wherein m number of the second switch circuits are denoted as $S_1'$~$S_m'$. In addition, the number of the second control signals lines is the same with the number of the first control signals lines, which are both n, wherein n number of the second control signals lines are denoted as $L_{c1}'$~$L_{cn}'$.

Wherein m and n satisfy the equation: $m=2^n-1$.

In the embodiment, the operation principle of the second strobe circuit 21' is the same with that of the first strobe circuit 21.

The third voltage line ($L_{v1'}$) is configured for inputting the first voltage (VDD), and the fourth voltage line ($L_{v2'}$) is configured for inputting the second voltage ($V_{com}$).

Each of the second switch circuits includes a third first voltage input end ($u_{1'}$), a fourth voltage input end ($u_{2'}$), a second output end ($u_{3'}$), and n number of second control signals input ends ($u_{41'}$~$u_{4n'}$). The third voltage input ends ($u_{1'}$) of m number of the second switch circuit ($S_1'$~$S_m'$) are connected to operate as the third end of the second strobe circuit 21' for providing the touch driving signals, and the third end connects to the third voltage line ($L_{v1'}$). That is, the third voltage input end ($u_{1'}$) of the m number of second switch circuits ($S_1'$~$S_m'$) connect to the third voltage line ($L_{v1'}$). The fourth voltage input ends ($u_{2'}$) of the m number of the second switch circuits ($S_1'$~$S_m'$) are connected to operate as the other third end of the second strobe circuit 21' connecting to the fourth voltage line ($L_{v2'}$). The second output end ($u_{3'}$) of each of second first switch circuits operates as the fourth end 212' of the second strobe circuit 21' connecting to one end of the wiring 23, the second control signals input ends ($u_{41'}$~$u_{4n'}$) of each of the n number of second switch circuits connect to the n number of second control signal line one by one, wherein the second output ends ($u_{3'}$) of different second switch circuits connect to different wirings.

In the embodiment, n number of second control signal line ($L_{c1'}$~$L_{cn'}$) respectively inputs control signals to the n number of second control signals input ends ($u_{41'}$~$u_{4n'}$) of each of the second switch circuit such that the second output end ($u_{3'}$) of each of the second switch circuits selectively connects with the third voltage line ($L_{v1'}$) or the fourth voltage line ($L_{2'}$). That is, the second output end ($u_{3'}$) selectively connects with one of the two third ends of the second strobe circuit 21', wherein when the second output end ($u_{3'}$) connects with the third voltage line ($L_{v1'}$), the first voltage (VDD) is transmitted to the wiring 23 connected with the second output end ($u_{3'}$) so as to provide the first voltage (VDD) to the touch electrode 22 connected with the wiring 23. When the second output end ($u_{3'}$) connects with the fourth voltage line ($L_{v2'}$), the second voltage ($V_{com}$) is transmitted to the wiring 23 connected with the second output end ($u_{3'}$) so as to provide the second voltage ($V_{com}$) to the touch electrode 22 connected with the wiring 23.

In addition, the control signals configure the second output end ($u_{3'}$) of one of the switch circuits to connect with the third voltage line ($L_{v1'}$), and the second output end ($u_{3'}$) of other switch circuits not to connect with the third voltage line ($L_{v1'}$). In this way, the first voltage (VDD) is transmitted to the touch electrodes 22 in turn.

Figure 12:
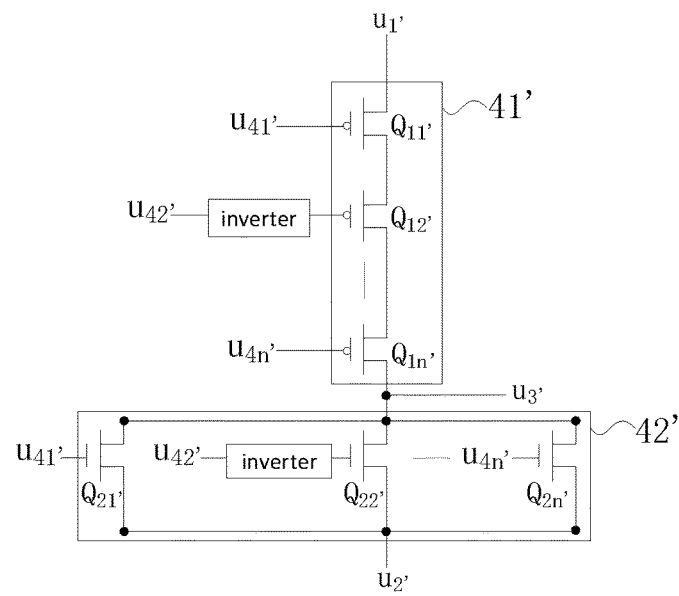
FIG. 12 is a schematic view of one first switch circuit of the touch panel of FIG. 11.

FIG. 12 is a schematic view of one first switch circuit of the touch panel of FIG. 11. In the embodiment, each of the second switch circuits includes a third switch unit 41' and a fourth switch unit 42'. The third switch unit 41' includes n number of third switch components ($Q_{11'}$~$Q_{1n'}$), and the fourth switch unit 42' includes n number of fourth switch components ($Q_{21'}$~$Q_{2n'}$), wherein n is an integer greater than or equal to one.

The n number of the third switch components ($Q_{11'}$~$Q_{1n'}$) are serially connected, one end of the serial branch of the n number of the third switch components ($Q_{11'}$~$Q_{1n'}$) connects to the third voltage input end ($u_{1'}$) of the second switch circuit, and the other end of the serial branch of the n number of the third switch components ($Q_{11'}$~$Q_{1n'}$) connects to the second output end ($u_{3'}$) of the second switch circuits, control ends of the n number of the third switch components ($Q_{11'}$~$Q_{1n'}$) connect to the n number of the second control signals input ends ($u_{41'}$~$u_{4n'}$) of the second switch circuits one by one.

N number of the fourth switch components ($Q_{21'}$~$Q_{2n'}$) are connected in parallel. One end of the n number of the fourth switch components ($Q_{21'}$~$Q_{2n'}$) connect to the second output end ($u_{3'}$) of the second switch circuit, and the other end of the n number of the fourth switch components ($Q_{21'}$~$Q_{2n'}$) connect to the second voltage input end ($u_{2'}$) of the second switch circuit. The control ends of the n number of the fourth switch components ($Q_{21'}$~$Q_{2n'}$) connect to the n number of the second control signals input ends ($u_{41'}$~$u_{4n'}$) one by one.

In the embodiment, at least one of the third switch component and at least one of the fourth switch component of the at least one of the m number of the second switch circuits connect to the same second control signal input end via an inverter. As shown in FIG. 12, the control ends of the third switch component ($Q_{12'}$) and the fourth switch component ($Q_{22'}$) connects to the same second control signals input end ($u_{42'}$), wherein the control ends of the third switch component ($Q_{12'}$) and the fourth switch component ($Q_{22'}$) may connect to the second control signals input end ($u_{42'}$) via the same or different inverter, wherein the inverter may be accomplished by one NAND gate.

In addition, the locations of the third switch components connected with the inverter are different with respect to different second switch circuits, and the locations of the fourth switch components connected with the inverter are different within the n number of fourth switch components ($Q_{21'}$~$Q_{2n'}$) connected in parallel. In addition, with respect to different second switch circuits, the number of the third switch components connected with the inverter may be the same or different. Also, the number of the fourth switch components connected with the inverter may be the same or different.

As shown in FIG. 12, the third switch component connected with the inverter is the 2st third switch component within the serially connected branch, and the fourth switch component connected with the inverter is the 2st fourth switch component within the n number of the second switch components connected in parallel. In another example, the third switch components connected with the inverter are the 1st and the 2st third switch components within the serially connected branch, and the fourth switch components connected with the inverter are the 1st and the 2st fourth switch component within the n number of the second switch components connected in parallel.

The control signals for turning on the third switch component and the fourth switch component of the same second control signals input end are opposite to each other, i.e., logically. In the embodiment, the n number of third switch components ($Q_{11'}$~$Q_{1n'}$) are PMOS transistors, and the control signals for turning on the third switch component are low level. That is, when the control signals of the control end are at the low level, the third switch component is turned on, and when the control signals of the control end are at the high level, the third switch component is turned off. The n number of the fourth switch components ($Q_{21'}$~$Q_{2n'}$) are NMOS transistor, and the control signals for turning on the fourth switch component are high level. That is, when the control signals of the control end are at the low level, the fourth switch component is turned off, and when the control signals of the control end are at the high level, the fourth switch component is turned on In other embodiments, the second switch component may be a P-type triode or other controllable switch, and the fourth switch component may be a N-type triode or other controllable switch.

In the embodiment, the second strobe circuit 21' is configured to provide the touch driving signals or the common voltage to the touch electrode 22 from the other end of the wiring 23 such that the first strobe circuit 21 and the second strobe circuit 21' provide the touch driving signals or the common voltage from two ends of the wiring 23, which can reduce the signal fading. The principle for determining the third switch component and the fourth switch component needed to connect with the inverter by the second strobe circuit 21' is similar to the principle for determining the first switch component and the second switch component needed to connect with the inverter by the first strobe circuit 21. The process may be referenced by referring to the descriptions regarding FIG. 5. In addition, the second strobe circuit 21' may be controlled by the same method similar to the first strobe circuit 21, and thus the corresponding descriptions are omitted hereinafter.

Figure 13:
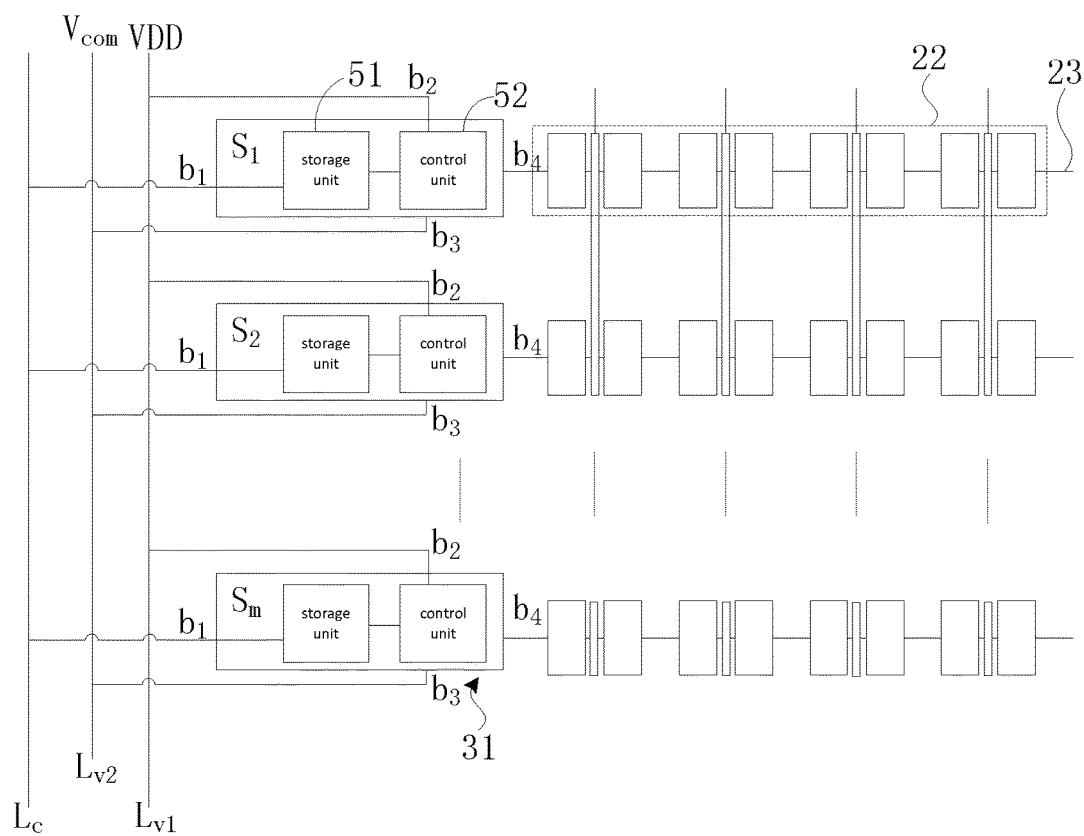
FIG. 13 is a schematic view of the touch panel in accordance with another embodiment.

FIG. 13 is a schematic view of the touch panel in accordance with another embodiment. The components having the same reference numerals operate in the same way. In this embodiment, the first switch circuit of the first strobe circuit 31 is accomplished by a control unit. Specifically, the touch panel includes one first control signals line, and m number of touch electrodes 22. The first strobe circuit 31 includes m number of first switch circuits denoted as $S_1$~$S_m$, wherein the structure of the m number of first switch circuits is different from that in FIG. 3. Each of the first switch circuits includes a storage unit 51 and a control unit 52 connected with each other. The storage unit 51 includes a control signals input end ($b_1$) operating as a first control signals input ends of the first switch circuit to connect with the first control signals line ($L_c$). The control unit 52 includes a first voltage input end ($b_2$), a second voltage input end ($b_3$), and an output end ($b_4$). The first voltage input end ($b_2$) operates as the first voltage input end of the first switch circuit to connect to the first voltage line ($L_{v1}$), the second voltage input end ($b_3$) operates as the second voltage input end of the first switch circuit to connect with the second voltage line ($L_{v2}$), and the output end ($b_4$) operates as the first output end of the first switch circuit to connect to one end of the wiring 23.

The storage unit 51 is configured for storing identification data, which is for identifying each of the first switch circuits so as to output the touch driving signals and the common voltage via the corresponding wiring 23 of the first switch circuit. The identification data of each of the first switch circuits are different.

The identification data may be a combination of binary "0" and "1". In an example, the identification data may be the binary codes of four digits.

The storage unit 51 of each of the first switch circuits stores a group of multiple binary digits. The first control signals line ($L_c$) inputs the control signals of the one group of multiple binary digits within each of the periods during the touch scanning phase. The storage unit 51 compares the received multiple binary digits and the stored multiple binary digits, and outputs the comparing result to the corresponding control unit 52. When the comparing result indicates that the received multiple binary digits are the same with the stored multiple binary digits, the control unit 52 connects the first voltage input end ($b_2$) and the output end ($b_4$) such that the first voltage (VDD) is transmitted to the corresponding touch electrode. When the comparing result indicates that the received multiple binary digits are different from the stored multiple binary digits, the control unit 52 connects the second voltage input end ($b_3$) and the output end ($b_4$) such that the second voltage ($V_{com}$) is transmitted to the corresponding touch electrode.

The number of the touch electrodes, i.e., m, and the digits of the identification data, i.e., x satisfy the equation: $m=2^x-1$, wherein x is an integer greater than or equal to 2. In an example, wherein m=15 and x=4. At this moment, there are 15 combinations including: "0001", "0010", "0011", "0100", "0101", "0110", "0111", "1000", "1001", "1010", "1011", "1100", "1101", "1110", and "1111." The number of the first switch circuits is also 15. The 15 combinations of four binary digits are respectively stored in the storage units 51 within each of the first switch circuits.

The touch scanning phase includes 15 periods. Within the 15 periods, the first control signals line ($L_c$) inputs the 15 combinations of the four binary digits in turn. That is, one combination of the four binary digits is inputted within each of the periods. The storage unit 51 of each of the first switch circuits compares the received four binary digits and the stored four binary digits, and outputs the comparing result to the control unit 52. When the comparing result indicates that the received multiple binary digits are the same with the stored multiple binary digits, the control unit 52 connects the first voltage input end ($b_2$) and the output end ($b_4$) such that the first voltage (VDD) is transmitted to the corresponding touch electrode. When the comparing result indicates that the received multiple binary digits are different from the stored multiple binary digits, the control unit 52 connects the second voltage input end ($b_3$) and the output end ($b_4$) such that the second voltage ($V_{com}$) is transmitted to the corresponding touch electrode.

Thus, with respect to the first switch circuit ($S_1$), only when the first control signals line ($L_c$) inputs the "0001", the first switch circuit ($S_1$) outputs the first voltage (VDD) to the connected touch electrode 22 so as to provide the touch driving signals. When first control signals line ($L_c$) inputs other four binary digits, the first switch circuit ($S_1$) outputs the second voltage ($V_{com}$) to the connected touch electrode 22. With respect to the second switch circuit ($S_2$), the second switch circuit ($S_2$) outputs the first voltage (VDD) to the connected touch electrode 22 only when the first control signals line ($L_c$) inputs the "0010" to provide the touch driving signals. When the first control signals line ($L_c$) inputs other four binary digits, the second switch circuit ($S_2$) outputs the second voltage ($V_{com}$) to the connected touch electrode 22. The output signals of other first switch circuits may be conceived in the same way.

When the first control signals line ($L_c$) inputs "0000", the first switch circuits ($S_1 \sim S_{15}$) outputs the second voltage ($V_{com}$).

Thus, the first switch circuit inputs the touch driving signals to the touch electrode 22 in sequence to realize the touch function. In addition, the first switch circuit inputs the common voltage to the touch electrodes 22 to realize the liquid crystal driving display. In view of the above, the number of the signals wirings may be greatly reduced so as to save the border space.

When more touch electrodes 22 are needed, the digits of the binary combination may be increased. In an example, the binary combination of five digits is capable of driving 31 touch electrodes.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A touch panel, comprising:
    a first strobe circuit, at least two touch electrodes arranged along a row direction, and at least two wirings, wherein one of the at least two wirings connects with one of the at least two touch electrodes;
    the first strobe circuit comprises at least two first ends and at least two second ends, wherein a first end from the at least two first ends is configured for providing touch driving signals, each of the at least two second ends directly or indirectly connects with one of the at least two wirings, and the first end from the at least two first ends for providing the touch driving signals selectively connects to a second end from the at least two second ends;
    wherein the touch panel further comprises a first voltage line, a second voltage line, and at least one first control signals line, and the first strobe circuit comprises at least two first switch circuits; the first voltage line is configured for inputting a first voltage forming the touch driving signals, and the second voltage line is configured for inputting a second voltage;
    each of the at least two first switch circuits comprises a first voltage input end, a second voltage input end, a first output end, and at least one first control signals input ends, the first voltage input ends of the at least two first switch circuits are connected to operate as the first end from the at least two first ends of the first strobe circuit for providing the touch driving signals, and the first end from the at least two first ends connects to the first voltage line, the second voltage input ends of the at least two first switch circuits are connected to operate as the other first end from the at least two first ends of the first strobe circuit, and the other first end from the at least two first ends connects to the second voltage line, the first output end of each of the first switch circuits operates as the second end from the at least two second ends of the first strobe circuit, and the second end from the at least two second ends connects to one end of one of the at least two wirings, the first output end of different first switch circuits connect to different wirings, at least one first control signals input ends of each of the at least two first switch circuits connect to the first control signals line one by one;
    the first control signals line inputs control signals to the first control signals input ends such that the first output end of each of the at least two first switch circuits selectively connects with the first voltage line or the second voltage line, when the first output end of one of the first switch circuit connects with the first voltage line, the first output ends of the other first switch circuits are not connected with the first voltage line; and
    the touch electrode operates as a common electrode of the touch panel.

2. The touch panel as claimed in claim 1, wherein each of the at least two first switch circuits comprises at least one first switch unit and at least one second switch unit;
    the first switch unit comprises at least one first switch components, the at least one first switch components are serially connected, one end of the serial branch of the at least one first switch components connects to the first voltage input end of the first switch circuit, and the other end of the serial branch of the at least one first switch components connects to the first output end of the at least two first switch circuits, control ends of the at least one first switch components connects to the at least one first control signals input ends of the at least two first switch circuits one by one;

the second switch unit comprises at least one second switch components connected in parallel, one end of the at least one second switch components connects to the first output end of the at least two first switch circuits, and the other end of the at least one second switch components connects to the second voltage input end of the at least two first switch circuits, the control ends of the at least one second switch components connect to the at least one first control signals input ends one by one;

wherein the control signals for respectively turning on the first switch component and the second switch component connected with the same first control signals input end are opposite to each other, at least one first switch component and at least one second switch component within at least one first switch circuit connects to the same first control signals input end by an inverter, locations of the first switch components connected with the inverter are different with respect to the serial branch of different first switch circuits from the at least two first switch circuits, and the locations of the second switch components connected with the inverter are different with respect to the second switch components connected in parallel of different first switch circuits from the at least two first switch circuits.

3. The touch panel as claimed in claim 2, wherein a number of the touch electrodes and the number of the first switch circuits are m, and the number of the first control signals lines, the first control signals input ends of each of the first switch circuits, the first switch components of each of the first switch circuits, and the second switch components of each of the first switch circuits are n, and m and n satisfy the equation: $m=2^n-1$, n is an integer and $n\geq 1$.

4. The touch panel as claimed in claim 2, wherein at least one first switch component is a PMOS transistor, and at least one second switch component is a NMOS transistor.

5. The touch panel as claimed in claim 1, wherein the touch panel further comprises a second strobe circuit, a third voltage line, a fourth voltage line, and at least one second control signals line, the second strobe circuit comprises at least two third ends, at least two fourth ends, and at least two second switch circuits, wherein a third end from the at least two third ends is configured for providing the touch driving signals;

the third voltage line is configured for inputting a first voltage, and the fourth voltage line is configured for inputting a second voltage;

each of the at least two second switch circuits comprises a third first voltage input end, a fourth voltage input end, a second output end, and at least one second control signals input end, the third voltage input ends of the at least two second switch circuits are connected to operate as the third end from the at least two third ends of the second strobe circuit for providing the touch driving signals, and the third end from the at least two third ends connects to the third voltage line, the fourth voltage input ends of the at least two second switch circuits are connected to operate as the other third end from the at least two third ends of the second strobe circuit, and the other third end from the at least two third ends connects to the fourth voltage line, the second output end of each of the at least two second first switch circuits operates as the fourth end from the at least two fourth ends of the second strobe circuit, and the fourth end from the at least two fourth ends connects to one end of one of the at least two wirings, the second output ends of different second switch circuits connect to different wirings, the second control signals input ends of each of the at least two second switch circuits connect to at least one second control signal line one by one; and the second control signal line respectively inputs the control signals to the second control signals input ends such that the second output end of each of the at least two second switch circuits selectively connects with the third voltage line or the fourth voltage line, when the first output end of one of the at least two second switch circuit connects with the third voltage line, the second output ends of the other second switch circuit from the at least two second switch circuits are not connected with the third voltage line.

6. The touch panel as claimed in claim 5, wherein the at least two second switch circuit comprises at least one third switch unit and at least one fourth switch unit;

the third switch unit comprises at least one third switch components serially connected, one end of the serial branch of the at least one third switch components connects to the third voltage input end of the second switch circuit, and the other end of the serial branch of the at least one third switch components connects to the second output end of the at least two second switch circuits, control ends of the at least one third switch components connect to the at least one second control signals input ends of the at least two second switch circuits one by one;

the fourth switch unit comprises at least one fourth switch components connected in parallel, one end of the at least one fourth switch components connects to the second output end of the second switch circuit, and the other end of the at least one fourth switch components connect to the second voltage input end of the at least two second switch circuit, the control ends of the at least one fourth switch components connect to the at least one second control signals input ends of the at least two second switch circuit one by one;

wherein the control signals for respectively turning on the third switch component and the fourth switch component connected with the same second control signals input end are opposite to each other, at least one third switch component and at least one fourth switch component within each of the at least two second switch circuits connects to the same second control signals input end by an inverter, locations of the third switch components connected with the inverter are different with respect to the serial branch of different second switch circuits from the at least two second switch circuits, and the locations of the fourth switch components connected with the inverter are different with respect to the fourth switch components connected in parallel of different second switch circuits from the at least two second switch circuits.

7. The touch panel as claimed in claim 6, wherein a number of the touch electrodes and the number of the second switch circuits are m, and the number of the second control signals lines, the second control signals input ends of each of the second switch circuits, the third switch components of each of the second switch circuits, and the fourth switch components of each of the second switch circuits are n, and m and n satisfy the equation: $m=2^n-1$, n is an integer and $n \geq 1$.

8. The touch panel as claimed in claim 6, wherein at least one third switch component is a PMOS transistor, and at least one fourth switch component is a NMOS transistor.

9. A touch panel, comprising:

a first strobe circuit, at least two touch electrodes arranged along a row direction, and at least two wiring, wherein one of the at least two wirings connects with one of the at least two touch electrodes; and the first strobe circuit comprises at least two first ends and at least two second ends, wherein a first end of the at least two first ends is configured for providing touch driving signals, each of the at least two second ends directly or indirectly connects with one of the at least two wirings, and the first end from the at least two first ends for providing the touch driving signals selectively connects to a second end from the at least two second ends;

wherein, the touch panel further comprises a first voltage line, a second voltage line, and at least one first control signals line, and the first strobe circuit comprises at least two first switch circuits; wherein, each of the at least two first switch circuits comprises a first voltage input end, a second voltage input end, a first output end, and at least one first control signals input ends; and wherein, the first voltage input ends of the at least two first switch circuits are connected to operate as the first end from the at least two first ends of the first strobe circuit for providing the touch driving signals, and the first end from the at least two first ends connects to the first voltage line, the second voltage input ends of the at least two first switch circuits are connected to operate as the other first end from the at least two first ends of the first strobe circuit, and the other first end from the at least two first ends connects to the second voltage line, the first output end of each of the first switch circuits operates as the second end from the at least two second ends of the first strobe circuit, and the second end from the at least two second ends connects to one end of one of the at least two wirings, the first output end of different first switch circuits connect to different wirings, at least one first control signals input ends of each of the at least two first switch circuits connect to the first control signals line one by one;

wherein, the first control signals line inputs control signals to the first control signals input ends such that the first output end of each of the at least two first switch circuits selectively connects with the first voltage line or the second voltage line, when the first output end of one of the first switch circuit connects with the first voltage line, the first output ends of the other first switch circuits are not connected with the first voltage line;

wherein each of the at least two first switch circuits comprises at least one first switch unit and at least one second switch unit;

the first switch unit comprises at least one first switch components, the at least one first switch components are serially connected, one end of the serial branch of the at least one first switch components connects to the first voltage input end of the first switch circuit, and the other end of the serial branch of the at least one first switch components connects to the first output end of the at least two first switch circuits, control ends of the at least one first switch components connects to the at least one first control signals input ends of the at least two first switch circuits one by one;

the second switch unit comprises at least one second switch components connected in parallel, one end of the at least one second switch components connects to the first output end of the at least two first switch circuits, and the other end of the at least one second switch components connects to the second voltage input end of the at least two first switch circuits, the control ends of the at least one second switch components connect to the at least one first control signals input ends one by one.

10. The touch panel as claimed in claim 9, wherein the first voltage line is configured for inputting a first voltage forming the touch driving signals, and the second voltage line is configured for inputting a second voltage.

11. The touch panel as claimed in claim 10, the first switch unit comprises at least one first switch components, the at least one first switch components are serially connected, one end of the serial branch of the at least one first switch components connects to the first voltage input end of the first switch circuit, and the other end of the serial branch of the at least one first switch components connects to the first output end of the at least two first switch circuits, control ends of the at least one first switch components connects to the at least one first control signals input ends of the at least two first switch circuits one by one;

the second switch unit comprises at least one second switch components connected in parallel, one end of the at least one second switch components connects to the first output end of the at least two first switch circuits, and the other end of the at least one second switch components connects to the second voltage input end of the at least two first switch circuits, the control ends of the at least one second switch components connect to the at least one first control signals input ends one by one;

wherein the control signals for respectively turning on the first switch component and the second switch component connected with the same first control signals input end are opposite to each other, at least one first switch component and at least one second switch component within at least one first switch circuit connects to the same first control signals input end by an inverter, locations of the first switch components connected with the inverter are different with respect to the serial branch of different first switch circuits from the at least two first switch circuits, and the locations of the second switch components connected with the inverter are different with respect to the second switch components connected in parallel of different first switch circuits from the at least two first switch circuits.

12. The touch panel as claimed in claim 11, wherein a number of the touch electrodes and the number of the first switch circuits are m, and the number of the first control signals lines, the first control signals input ends of each of the first switch circuits, the first switch components of each of the first switch circuits, and the second switch components of each of the first switch circuits are n, and m and n satisfy the equation: $m=2n-1$, n is an integer and $n \geq 1$.

13. The touch panel as claimed in claim 11, wherein at least one first switch component is a PMOS transistor, and at least one second switch component is a NMOS transistor.

14. The touch panel as claimed in claim 10, wherein the touch panel further comprises a second strobe circuit, a third voltage line, a fourth voltage line, and at least one second control signals line, the second strobe circuit comprises at least two third ends, at least two fourth ends, and at least two second switch circuits, wherein a third end from the at least two third ends is configured for providing the touch driving signals;

the third voltage line is configured for inputting a first voltage, and the fourth voltage line is configured for inputting a second voltage;

each of the at least two second switch circuits comprises a third first voltage input end, a fourth voltage input end, a second output end, and at least one second control signals input end, the third voltage input ends of the at least two second switch circuits are connected to operate as the third end from the at least two third ends of the second strobe circuit for providing the touch driving signals, and the third end of the at least two third ends connects to the third voltage line, the fourth voltage input ends of the at least two second switch circuits are connected to operate as the other third end from the at least two third ends of the second strobe circuit, and the other third end from the at least two third ends connects to the fourth voltage line, the second output end of each of the at least two second first switch circuits operates as the fourth end from the at least two fourth ends of the second strobe circuit, and the fourth end from the at least two fourth ends connects to one end of one of the at least two wirings, the second output ends of different second switch circuits connect to different wirings, the second control signals input ends of each of the at least two second switch circuits connect to at least one second control signal line one by one; and the second control signal line respectively inputs the control signals to the second control signals input ends such that the second output end of each of the at least two second switch circuits selectively connects with the third voltage line or the fourth voltage line, when the first output end of one of the at least two second switch circuit connects with the third voltage line, the second output ends of the other second switch circuit from the at least two second switch circuits are not connected with the third voltage line.

15. The touch panel as claimed in claim 14, wherein the at least two second switch circuit comprises at least one third switch unit and at least one fourth switch unit; the third switch unit comprises at least one third switch components serially connected, one end of the serial branch of the at least one third switch components connects to the third voltage input end of the second switch circuit, and the other end of the serial branch of the at least one third switch components connects to the second output end of the at least two second switch circuits, control ends of the at least one third switch components connect to the at least one second control signals input ends of the at least two second switch circuits one by one;

the fourth switch unit comprises at least one fourth switch components connected in parallel, one end of the at least one fourth switch components connects to the second output end of the second switch circuit, and the other end of the at least one fourth switch components connect to the second voltage input end of the at least two second switch circuit, the control ends of the at least one fourth switch components connect to the at least one second control signals input ends of the at least two second switch circuit one by one;

wherein the control signals for respectively turning on the third switch component and the fourth switch component connected with the same second control signals input end are opposite to each other, at least one third switch component and at least one fourth switch component within at least one of the at least two second switch circuits connects to the same second control signals input end by an inverter, locations of the third switch components connected with the inverter are different with respect to the serial branch of different second switch circuits from the at least two second switch circuits, and the locations of the fourth switch components connected with the inverter are different with respect to the fourth switch components connected in parallel of different second switch circuits from the at least two second switch circuits.

16. The touch panel as claimed in claim 15, wherein a number of the touch electrodes and the number of the second switch circuits are m, and the number of the second control signals lines, the second control signals input ends of each of the second switch circuits, the third switch components of each of the second switch circuits, and the fourth switch components of each of the second switch circuits are n, and m and n satisfy the equation: $m=2^n-1$, n is an integer and $n \geq 1$.

17. The touch panel as claimed in claim 15, wherein at least one third switch component is a PMOS transistor, and at least one fourth switch component is a NMOS transistor.

18. The touch panel as claimed in claim 9, wherein the touch electrode operates as a common electrode of the touch panel.

* * * * *